US005452470A

United States Patent [19]

Kantner, Jr. et al.

[11] Patent Number: 5,452,470

[45] Date of Patent: Sep. 19, 1995

[54] USE OF VIDEO RAM IN HIGH SPEED DATA COMMUNICATIONS

[75] Inventors: Robert F. Kantner, Jr.; Tze-Wing Keung; Jace W. Krull; Shahram Salamian, all of Boca Raton, Fla.

[73] Assignee: International Business Machines Corporation, Armonk, N.Y.

[21] Appl. No.: 294,292

[22] Filed: Aug. 23, 1995

Related U.S. Application Data

[63] Continuation of Ser. No. 810,267, Dec. 19, 1991, abandoned.

[51] Int. Cl.[6] .............................................. G06F 12/00

[52] U.S. Cl. ............................... 395/200.08; 395/821; 395/476; 395/444; 364/DIG. 1; 364/244.6; 364/251; 364/252

[58] Field of Search ................ 395/425, 800; 364/251, 364/252, 244.6

[56] References Cited

U.S. PATENT DOCUMENTS

| | | | |
|---|---|---|---|
| 4,891,751 | 1/1990 | Call et al. | 395/800 |
| 5,065,369 | 11/1991 | Toda | 365/230.05 |
| 5,097,447 | 3/1992 | Ogawa et al. | 365/200 |
| 5,119,200 | 6/1992 | Van Den Hombergh | 358/188 |
| 5,157,776 | 10/1992 | Foster | 395/425 |
| 5,159,443 | 10/1992 | Ando | 358/800 |
| 5,163,024 | 10/1992 | Heilveilj et al. | 365/219 |

*Primary Examiner*—Eric Coleman
*Assistant Examiner*—Denise Tran
*Attorney, Agent, or Firm*—Robert S. Babayi

[57] ABSTRACT

A data communication system contains a dual-port/dual-access-mode storage subsystem, and a communication controller connecting between that subsystem and external data communication channels. The storage subsystem includes one or more dual-port/dual-access mode storage devices consisting of a pair of random access and sequential access memory arrays, with a parallel block transfer connection between the arrays. The sequential access array can store a large block of up to N bytes (N for example equal to 256), and the random access array can store multiple such blocks. The subsystem also has RAM and SAM access ports respectively controllable in random access and sequential access modes and respectively connecting to the random access and sequential access arrays. In random access mode a group of from 1 to 4 bytes is transferred between the controller and a specified address in the random access array, and in sequential access mode a block of up to N bytes is transferred in a sequential manner between the controller and the sequential access array and in a parallel manner between that array and a discretely addressed block of space in the random access array. Transfers of relatively long and short data communication messages are routed respectively through the SAM and RAM external ports by the controller, so as to efficiently match bandwidth requirements of external communication channels with access characteristics of the RAM and SAM ports.

17 Claims, 14 Drawing Sheets

(PRIOR ART VRAM USAGE)

FIG. 6

| Operation | Comm Ctlr | Stg Ctlr |
|---|---|---|
| "Normal" Read | Req Rd cycle, give address<br><br>Accept data | Gen RAS, CAS, tfr data from RAM to RAM port, acknowledge (ack) |
| "Normal" Write | Req Wr cycle, give addr, data | Gen RAS, CAS, tfr data into RAM, ack |
| Read Transfer | Req RdT cycle, give addr<br><br>Rcv data from shift reg in seq | Tfr RAM row to shift reg in parallel, set ser port for output, set pointer (ptr), ack |
| Pseudo Write Transfer | Req PWrT cycle, give addr | Set ser port for input, set ptr, ack |
| Write Transfer | Tfr data to shift reg, req WrT cycle, give addr | Tfr data to RAM in parallel, ack |
| RdModifyWr Tfr | Req RdT addr A | Parallel tfr RAM to shift reg, set ptr, ack |
| | Req PWrT addr A Tfr data to shift reg | Set ser port for input, ack |
| | Req WrT addr A | Parallel tfr shift reg to RAM, ack |

* "D/B end" means first of end of data or end of blk

NOTATION: x DENOTES : 1A, 1B, 2A OR 2B
y DENOTES A OR B

USE OF VIDEO RAM IN HIGH SPEED DATA COMMUNICATIONS

This is a continuation of application Ser. No. 07/810,267 filed Dec. 19, 1991, now abandoned.

FIELD OF THE INVENTION

This invention relates to a system and method for facilitating high speed data communication. An important aspect of the invention involves a novel use of known memory devices for sustaining high speed data communication processes. Such devices hitherto have been used for supporting video display processes, and by virtue of such use are sometimes termed Video RAM devices (or VRAM's).

BACKGROUND OF THE INVENTION

Recognizing a continuing trend of growth in computing and networking technologies, a problem confronted presently is how to provide optimal buffer storage of data relative to ultra high speed communication channels, so that data communication processes relative to such channels are minimally obstructed by data storage constraints.

OBJECTS OF THE INVENTION

A principal object of the invention is to provide an efficient system for storing and transferring data relative to high speed data communication networks.

Another object is to provide an efficient system for storing and transferring data relative to communication networks, in which the time required to access storage presents minimal potential obstruction to communication processes, when compared to storage of data in comparable prior art communication environments.

Another object is to provide a system for making storage available to data communication facilities on a more efficient basis in comparison to comparable prior art systems. Another object is to provide a system for making storage efficiently available to data communication facilities in a manner effectively providing storage bandwidth capable of matching bandwidths of ultra high speed data communication links.

A related object is to provide a system for storing and transferring data relative to data communication links, wherein transfers of data packets having a length exceeding a predetermined threshold length are conducted through a first storage port controlled in a sequential access mode and transfers of data packets having a length shorter than the threshold length are conducted through a second storage port controlled in random access mode; wherein the second storage port connects directly with random access storage arrays and the first port connects indirectly with the same arrays through a buffer register having a wide parallel connection to the random access arrays.

Another object is to provide a system for storing and transferring data relative to high speed communication channels, wherein data is transferred between the channels and a dual ported random access memory having first and second access ports respectively controllable in random access and sequential access modes, wherein transfers relative to the first port in random access mode are made directly relative to individually addressable storage cells in the memory and transfers relative to the second port in sequential access mode are made relative to a register in the memory which is connectable in parallel to large groups of the individually addressable storage cells.

A related object is to provide a system as characterized in the preceding object wherein data packets having different formats are selectively transferred through the first and second memory ports as a function of respective packet formats. Another related object is to provide a system as so characterized wherein data being written to memory through the second port controlled in sequential access mode is controllably placed in the register associated with that port and transferred in parallel from that register to storage in a manner such that the information stored in some of the storage cells that are affected by the parallel transfer is left unmodified.

Another object is to provide an efficient data communication system which makes novel use of known dual ported VRAM type storage devices for storing data that is being communicated, wherein access characteristics of the storage devices support real time transfers of data relative to communication channels at transfer rates effectively exceeding capabilities of dual ported memory devices hitherto used in a comparable manner.

SUMMARY OF THE INVENTION

These and other objects hereof are realized by constructing present systems for storing and transferring data, relative to high speed data communication links or networks, around dual ported "video RAM" (VRAM) memory units that heretofore have been used principally for graphics processing and video display purposes.

Such VRAM memory units typically contain a bank of random access storage arrays, that is accessible directly through a first port in a random access mode, and a sequentially accessible register or comparable device that is accessible directly through a second port, in a sequential access mode, and is connectable in parallel to the random access arrays. The size of the parallel connection and operating characteristics of the first and second ports are such that the amount of data which can be transferred through the second port and the parallel connection in a given interval of time is several times greater than the maximum amount of data which could be transferred through the first port in an equal interval. However, data transferrable through the second port in that interval can only be directed to or retrieved from one specific block of contiguously located storage cells in the random access arrays (typically, one entire row in one or more arrays), whereas the same amount of data could be transferred relative to many non-contiguous locations in the same arrays via the first port.

In random access mode, an address applied to the storage controls selects storage cells in an associated row of the random access arrays at a small group of column locations in the row, and data is read or written between the selected cells and the random access interface of the memory (RAM port). In sequential access mode, data is transferred in parallel between the sequential access register and all storage cells in a designated row of the random access arrays, and data is transferred in a sequential mode between the register and the sequential access interface of the memory (SAM port).

Since a cycle of parallel transfer between the random access arrays and sequential access register takes about the same time as a cycle of read or write access to the RAM port, and since the amount of data transferrable to the register in one cycle of storage operation is an order of magnitude greater than the amount transferrable relative to the RAM port in a comparable cycle time, it should be understood that large data blocks (e.g. blocks at least half the width of a RAM row) are transferrable through the SAM port at a much higher rate than they could be if transferred piecemeal through the RAM port. Also, since the RAM port is accessible while data is being transferred between the sequential access register and the SAM port interface, it can be understood that the SAM port transfers are even more effective in respect to their overall usage of storage facilities, and present less obstruction to the flow of information to and from storage than transactions at the RAM port.

In known video display applications of such VRAM units, data is written from a central processing unit to memory through the random access port and read from memory to a video display controller through the sequential access port. In present usage, for communication purposes, data is transferred bidirectionally through both ports by a communication controller, and the ports used for such transfers are determined selectively so that utilization of memory is potentially enhanced. Data transferred by the communication controller through the RAM port includes control information associated with communication processes and data packets of less than a predefined threshold length that are undergoing transmission on communication links served by the communication controller. Data transferred by the same controller relative to the SAM port of the unit consists only of data packets of at least the predefined threshold length that are undergoing link transmission.

Data is written to storage through the SAM port by means of a Write Transfer operation. When data so written does not fill an entire memory row, the Write Transfer operation is part of a special Read Modify Write Transfer sequence in which portions of data in the addressed row are effectively preserved.

Operations by the communication controller and other system entities relative to the RAM port of the VRAM unit are coordinated by a storage controller so that time overlapped requents for access to the same address are always serviced in a non-conflicting manner.

In one embodiment described herein, data that is being externally communicated is stored in a dual ported memory subsystem that contains a combination of dual ported VRAM units and single ported DRAM (dynamic random access memory) memory units; the latter accessible only in random access mode. Subsystem ports connecting to these units are accessible in random access and sequential access modes as characterized above. The port which is accessible in sequential access mode is used only by the communication controller and only for conducting bidirectional transfers of data that is being externally communicated as described above. The port accessible in random access mode is used by the communication controller and other system processing entities for conducting bidirectional transfers of data, potentially including data which need not be related to communication processes served by the communication controller. In this environment, mixed use of VRAM and DRAM units provides net cost/performance advantages relative to a memory subsystem containing only VRAM units.

These and other features, effects, advantages and benefits of the present invention may be more fully understood and appreciated by considering the following description and claims.

DESCRIPTION OF THE DRAWINGS

FIG. 6 is a chart useful for explaining operations of the memory unit and communication control device of FIG. 5 in the configuration shown in that Figure.

DETAILED DESCRIPTION OF THE INVENTION

1. Explanation of Problem Solved by Invention

Figure 1:
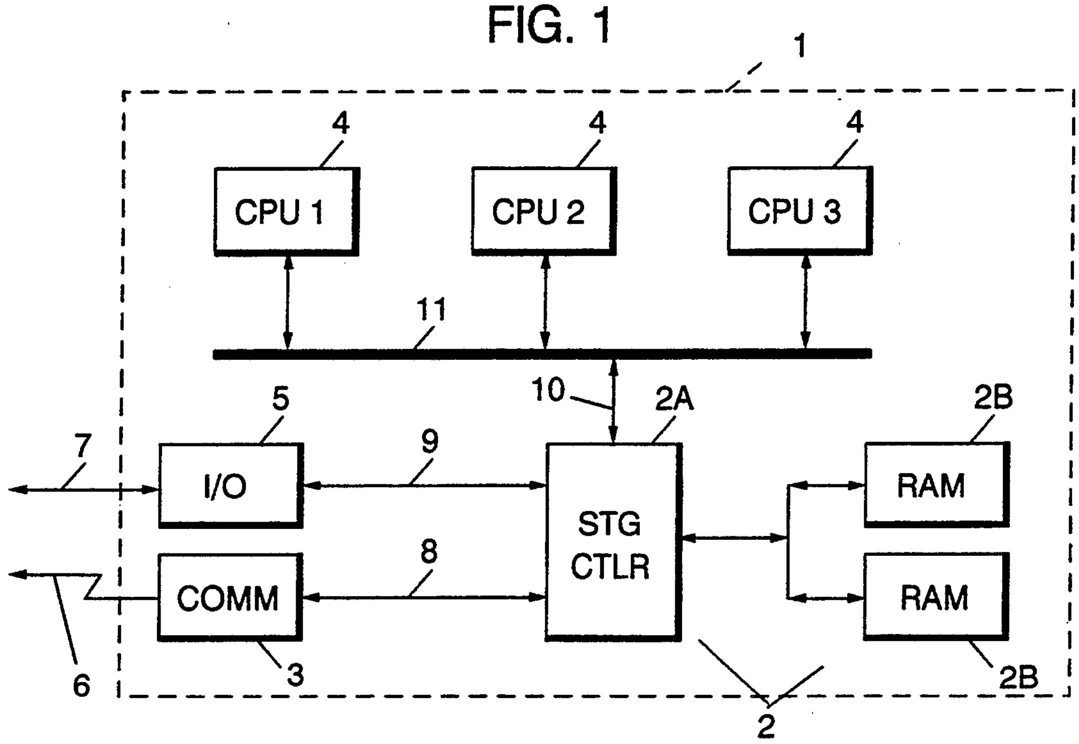
FIG. 1 is a schematic of a data processing station, for a communication network, that is useful for explaining a potential storage access restriction problem to which the present invention is addressed.

FIG. 1 illustrates a processing element (PE) 1 that represents one station in a network of intercommunicating stations. The network may include similar processing element configurations at other (not shown) stations. The organization of PE1 is useful for explaining potential storage access restriction problems which can be reduced or eliminated by means of the present invention.

PE 1 contains a store 2, a communication control controller 3 (referred to later as "comm ctlr"), one or more central processing units (CPU's) 4, and an input-/output processor (IOP) 5.

Store 2 contain a storage control ("stge ctl") section 2A and a number of random access memory (RAM) arrays or banks of arrays 2B. Arrays or array banks 2B may be implemented by means of commercially available (single-ported or multi-ported) dynamic random access memory devices (DRAM's) or static random access memory devices (SRAM's) having well known form and operating modes.

Comm ctlr 3 connects, via one or more high speed data communication links (or channels) 6, to other network stations (not shown). Such other stations may include other PE's configured similar to PE 1. IOP 5 connects to peripheral devices (not shown), via external bus 7; e.g. disk storage devices, printers, etc. Comm ctlr 3, IOP 5 and CPU's 4 have respective connections 8–10 to store 2. These connections may be directed to physically or logically separate ports of subsystem 2. Connection 10 extends to individual CPU's 4 via a common bus 11.

Each of the storage connections 8–10 includes lines (not shown) for separately conducting control, address and data signals relative to subsystem 2. Conventionally, the lines for conducting control signals include at least one line for indicating whether data is to be read from or written to the storage address designated by the address signals. Requests presented at connection interfaces 8–10 may be handled either sequentially or simultaneously by stge ctlr 2A, depending upon the internal configuration of memory units and connection paths within the store.

In servicing each request presented at interfaces 8–10, stge ctlr 2A decodes address signals received from the requesting entity (CPU, IOP, comm ctlr) into row address select (RAS) and column address select (CAS) signals designating particular row and column crosspoints in one or more RAM banks 2B. Each CAS signal designates a row in array/bank 2B containing a large number of bit storage cells. Each CAS signal designates a discrete subset of the set of all cells in the row designated by the associated RAS signal. It is understood that in response to each request received at interfaces 8–10, data is transferred in parallel between the subset of bit storage cells designated by associated RAS and CAS signals and the requesting entity; typically, one, two or four bytes of data per request .

To initiate a communication process over links 6, control information (Request Descriptor) defining the process parameters are prepared by any of the CPU's 4 and transferred to comm ctlr 3. Comm ctlr 3 interprets the information and directs performance of the associated process. In the illustrated environment, such request descriptors are transferred from CPU's to prearranged locations in store 2 and retrieved by comm ctlr 3 through a process of polling conducted by the latter relative to the prearranged locations.

The problem presently addressed can be understood by considering the following communication scenario. Assume a peak aggregate bit rate on links 6 on the order of 80 MB/sec (Bytes per second), and a ratio on the links of 20/80 between signals associated with control functions and signals representing data transmission; that ratio implying a data transfer rate on the links of 64 MB/sec second with a corresponding data transfer rate requirement relative to storage. Given this, one infers a similar demand rate of 64 MB/sec between IOP 5 and storage, assuming that a high proportion of communicated data handled between links and storage may originate at and flow to I/O devices.

Aside from the data traffic handled by it, comm ctlr 3 might be expected to impose an additional demand on storage of about 6 MB/sec for accessing stored control and status information structures discussed later (Descriptors).

Each CPU could be expected to present a demand load of about 4–6 MB/sec relative to storage, so that the 4 CPU's together could present a peak demand load of about 20 MB/sec at their storage interface 10.

Therefore, in this scenario, all of the entities using storage could impose a peak aggregate load on storage of about 170 MB/sec. Although the average load would be considerably less, sound design practice would require the storage subsystem to be able to handle 60 to 70% of the peak rate, or about 100 to 115 MB/sec. A rate of this magnitude would be extremely difficult if not impossible to sustain with a storage system built around currently available random access memory devices with conventional access controls.

Thus, in a system having high speed communication requirements in accordance with the foregoing scenario, one might expect that under peak load conditions the system would block, and communication processes would overflow or underflow (depending on direction). Error indications generated upon such overflow/underflow would induce repetitions of respective processes that would tend to add to aggregate traffic loads in the external links and increase potential for further bottlenecks, etc.

The potential for such blocking to occur could be reduced by splitting store 2 into two or more physically separate sections, each having a respective separate set of memory arrays/banks like 2B and a separate storage controller. However, split storage arrangements of that type pose added problems for system programmers, in respect to the associated splitting of the storage address space, and the associated requirement for synchronous operation of plural storage controllers would add to hardware costs and complicate system design/development.

2. Overview of Present Solution

Figure 2:
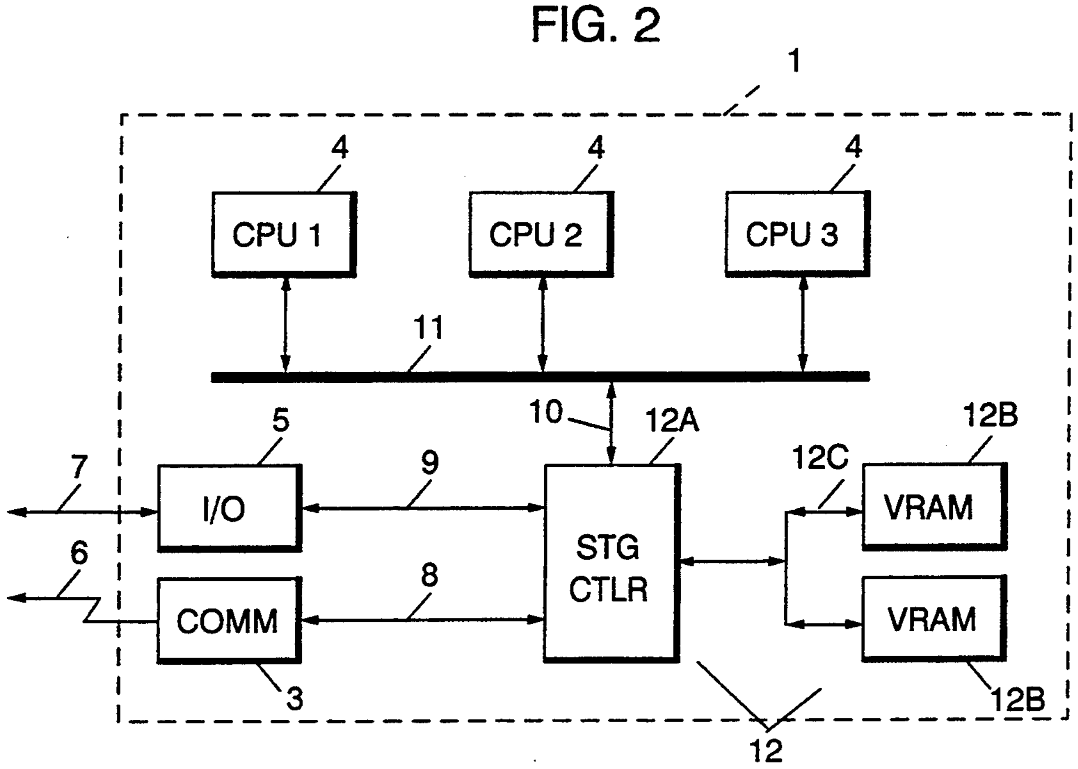
FIG. 2 is a schematic of the same station indicating in a very general context the approach taken presently to mitigate the access restriction problem.

The more efficient solution adopted presently, and suggested in FIG. 2, is to use a modified storage subsystem 12 containing one or more "VRAM" type memory devices 12B having connections 12C to an associated stge ctlr 12A and comm ctlr 3 that are presently deemed unique.

3. Prior Art Use of VRAM Type Storage

Figure 3:
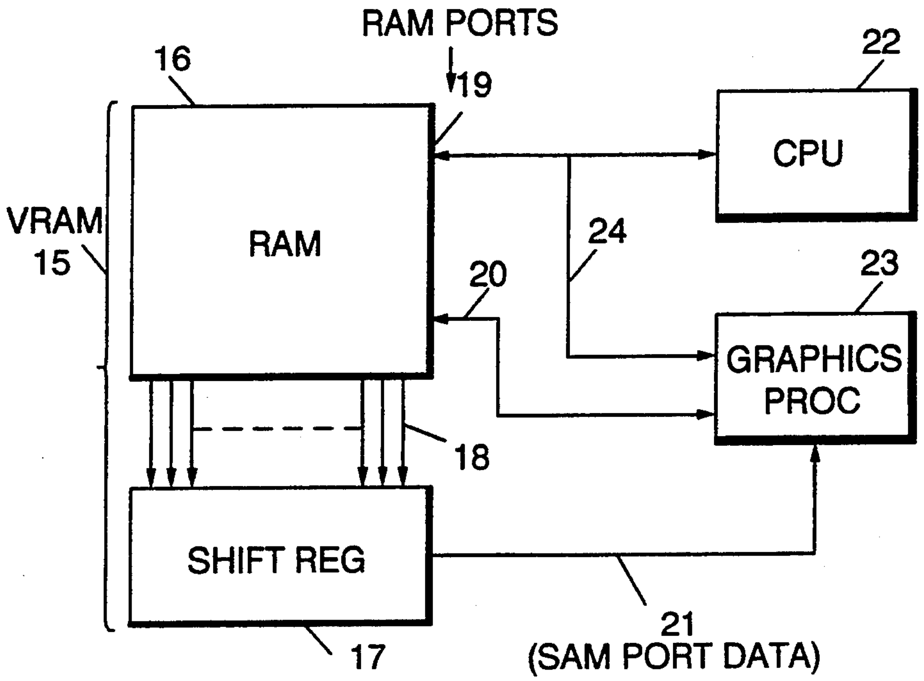
FIG. 3 is a schematic block diagram illustrating a contemporary dual-port/dual-mode ("VRAM") memory unit and its presently conventional use in video display and graphic processing applications.

In order to understand the uniqueness of the present solution, it is important to understand first how VRAM devices have been used heretofore for display control and graphic processing applications. FIG. 3 provides a simplified view of a processing system embodying such prior art usage.

VRAM device/unit 15 contains one or more random access storage arrays 16, and a register 17 or functionally equivalent storage element having a "wide" parallel connection 18 to the arrays. The capacity of register 17, width of connection 18, and internal operating controls and characteristics of the unit, allow data to be transferred in parallel between the register and all storage cells in any row of arrays 16.

Arrays 16 are directly accessible at ports 19 and 20, for conducting external data transfers in random access mode directly between arrays 16 and either CPU 22 or graphics coprocessor 23. Arrays 16 are also accessible indirectly through port 21, for conducting parallel transfers of data relative to register 17, and the register is accessible directly at 21 for conducting sequential transfers of data between graphics processor 23 and the register in association with individual parallel transfers. Ports 19 and 20 are referred to hereafter as RAM (random access mode) ports, and port 21 is termed the SAM (sequential access mode) port.

In prior art usage, the RAM ports are used to transfer graphic data (typically data suitable for modulating a CRT display raster) bidirectionally between the CPU and arrays 16, and the SAM port associated with path 21 is used to transfer graphics data unidirectionally from storage to coprocessor 23 (and/or an associated display control unit). Unit 23 also may have a connection as shown to one of the RAM ports 20 and another connection 24 to CPU 22.

Store 15 is controlled by a stge ctlr (not shown in this figure) which receives access requests from CPU 22 and unit 23 and directs input (write) and output (read) data transfers relative to both units via the RAM and read transfers relative only to unit 23 via the SAM port. In response to each CPU request, data (1, 2 or 4 bytes) is transferred between memory and port 19. In response to requests for RAM mode operation from unit 23, data (1, 2 or 4 bytes) is transferred between memory and unit 23. In response to requests for SAM mode operation, a large block of data (e.g. 256 bytes) is transferred in parallel from a row in RAM's 16 to register 17, and then that data is transferred sequentially (e.g. 4 bits at a time) from the register to unit 23.

Operation of storage in a SAM mode transfer is completed when the data is transferred to register 17 (i.e. the store is free for other operations while the data is being transferred from the register to unit 23), and the time allowed for that operation is about the same as the time allowed for a RAM mode transfer. Furthermore, the rate of transfer of data from the register to unit 23 is much faster than the rate of operation of storage relative to individual requests. Thus, it is understood that the rate of access to data in SAM mode may be orders of magnitude faster than the rate of access to data in RAM mode.

Figure 4:
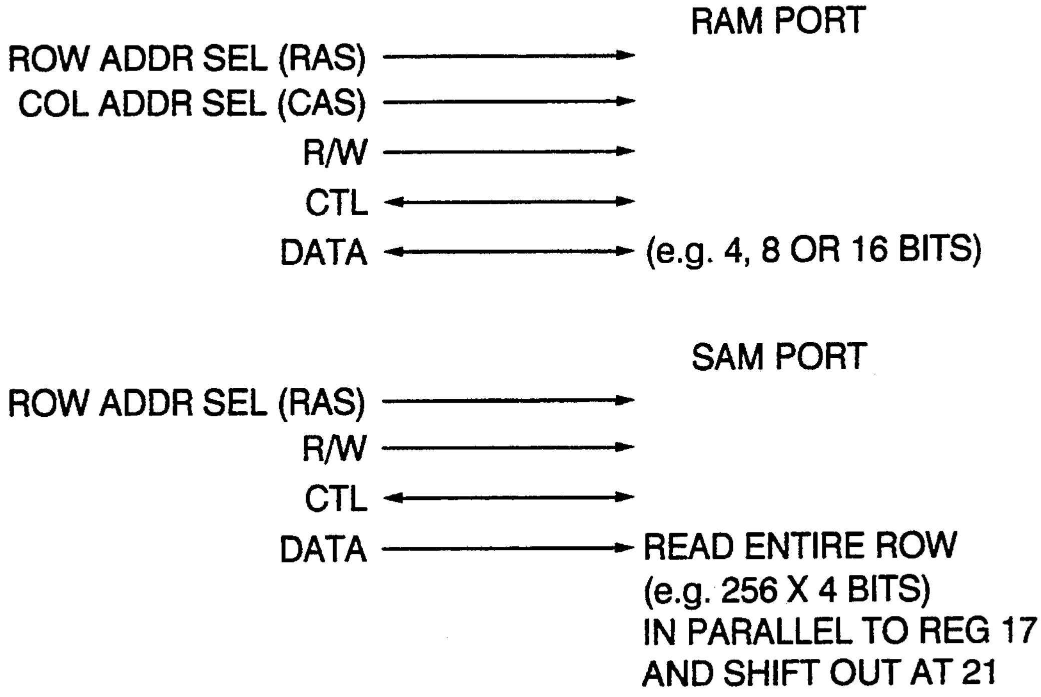
FIG. 4 is a chart useful for explaining operations conducted at random access and sequential access ports of the memory unit shown in FIG. 3, its conventional display/graphics usage.

As shown in FIG. 4, requests for RAM mode data transfer are accompanied by address signals which are converted (by the stge ctlr) to row address select (RAS) and column address select (CAS) signal functions. The CAS and RAS signals select cells in particular row and column positions of array(s) 16, and data is transferred in parallel (typically, 4, 8 or 16 bits) between those cells and the requesting entity.

Typically, a contemporary VRAM device could have a cycle time on the order of 190 ns (nanoseconds) for performing either a single read or write transfer operation relative to its RAM ports, or a single parallel internal transfer between RAM array(s) and shift register; and data could be clocked out of the shift register by a clock having a much shorter cycle time, on the order of 30 ns. Since the number of bits that can be transferred relative to the shift register, in a single cycle of addressing operation relative to the SAM port, may be a large multiple of the number of bits transferrable in a RAM port access (e.g. a multiple on the order of 512), it should be appreciated that the maximum rate of bit transfer through the SAM port can be much higher than the maximum rate of bit transfer that can be achieved at the RAM ports.

4. Overview Of VRAM Use In Present Invention 4.1 Basic Storage Configuration

Figure 5:
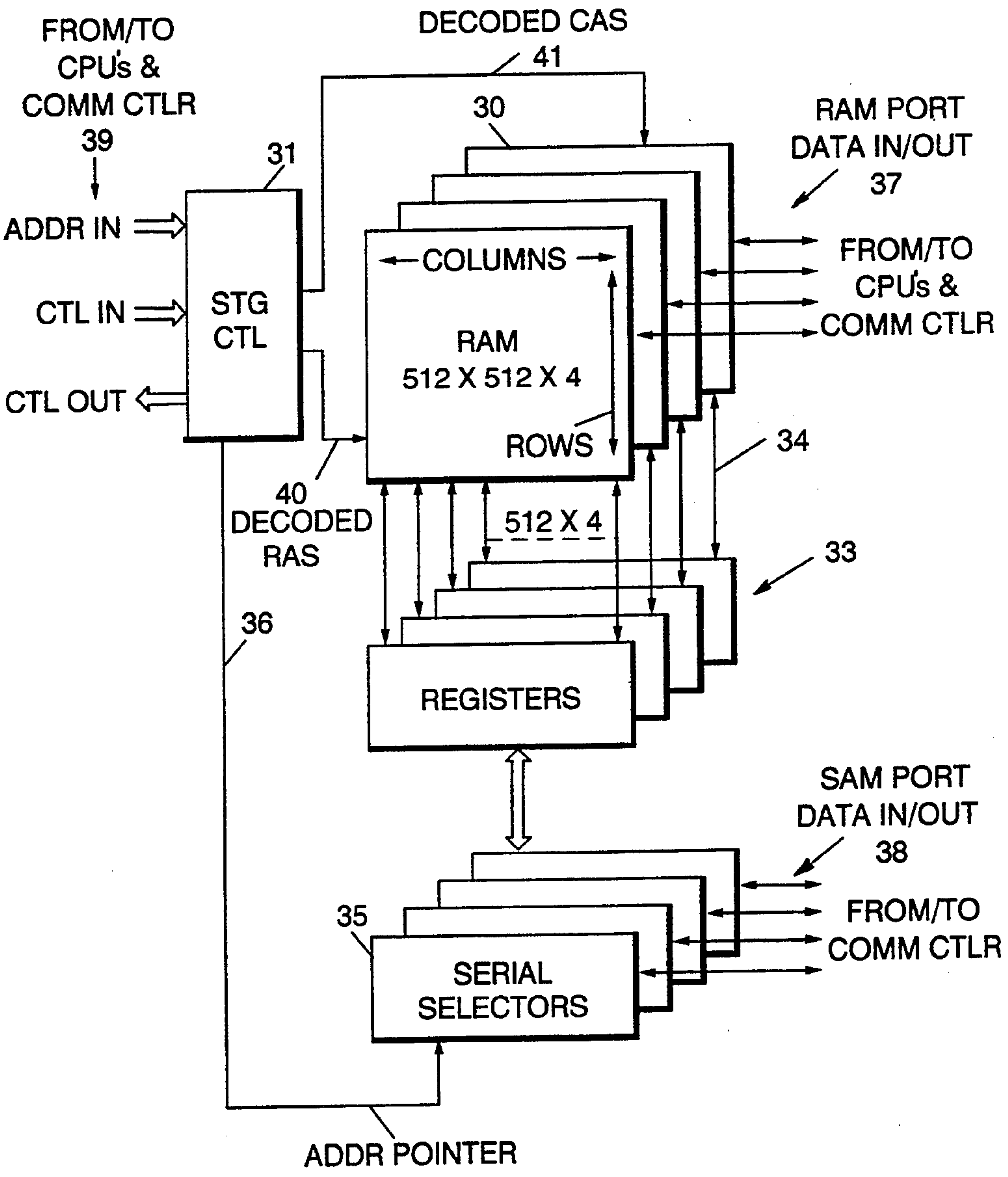
FIG. 5 is a schematic block diagram illustrating how a VRAM memory unit of the type shown in FIG. 3 is adapted in accordance with the present invention for use relative to a communication control device.

FIG. 5 shows a "simplified" storage arrangement in accordance with the present invention which contains only a VRAM type memory device. Other drawings discussed later will show more complex storage configurations in accordance with this invention, that contain combinations of different types of memory devices; including one or more VRAM devices and one or more single-ported DRAM devices.

The store in FIG. 5 contains a bank of four RAM arrays (RAM's) 30, storage access controls (stge ctlr) 31, and four shift registers 33. Registers 33 are connectible in parallel to respective RAM's 30 as indicated at 34. The RAM's, shift registers and their parallel interconnection may be embodied in a single CMOS multiport integrated memory device; for instance, a device such as Toshiba Memory Products Company part number TC524256P/Z. Stge ctlr 31 is of a design suited to the required application.

Selector circuits 35 operate in association with a pointer function provided at 36 to control sequential transfer of data between registers 33 and a communication controller (comm ctlr) via external sequential access interface 38. The comm ctlr and its connections to external communication links are understood but not shown in this figure. The comm ctlr is the only processing entity having access to registers 33 in this arrangement.

RAM arrays 30 couple directly to the comm ctlr and not shown CPU's of an associated PE (processing element) via external random access interface 37. Address and control signals provided by the comm ctlr and CPU's at control interface 39, via ADDR IN (address in) and CTL IN (control in) lines, establish the mode of operation of stge ctlr 31 and the external interface path for signal transfer (37 or 38).

Presently significant differences between the prior art storage arrangement in FIG. 3 and the arrangement now being described are that in the present arrangement: the sequential transfer interface is connected to a communication controller (rather than a display controller or graphics coprocessor), data transferrable at that interface is any externally communicatable data (rather than data associated exclusively with graphics or display functions), the connection at that interface is bidirectional (for supporting bidirectional parallel transfers of data between registers 33 and arrays 30), and the comm ctlr directs transfers of communication data and other information selectively relative to interfaces 37 and 38 in a manner designed to optimize availability of storage to both it and other entities.

Rows and columns in each array 30 are 512 bits wide. In RAM mode, stge ctlr 31 decodes an address supplied by the requesting entity (CPU or comm ctlr) to establish a pair of RAS and CAS values which effectively designate (select) a row and column intersection in each array, and data is transferred in parallel between the (four) bit storage cells located at these intersections and the requesting entity. In SAM mode, the entire row designated by the RAS value is selected (in each array 30), and 512×4 bits of data are transferred in parallel between all cells in the selected row and registers 33.

When the SAM mode parallel transfer is into the CAS designated row (i.e. a write transfer), data presented by the comm ctlr at interface 38 is entered into the registers prior to the parallel transfer. When the SAM mode parallel transfer is from the selected row to the registers (i.e. an output or read transfer), data received in the registers may be subsequently transferred to the comm ctlr via interface 38. Transfers between registers 33 and interface 38 are conducted in a sequential mode (4 bits at a time) in which circuits 35 and the comm ctlr act cooperatively. During such sequential mode transfers the stge ctlr and arrays 30 are free to handle other storage operations.

In each SAM mode transfer, the CAS value generated by stge ctlr 31 is used to establish a pointer function relative to registers 33. The pointer value is transferred to circuits 35 via lines 36 and used by the latter to select an initial position in the registers at which the associated sequential transfer is to start. The sequential transfer is then made relative to the starting position and successive register positions in a predetermined direction (e.g. from left to right in the illustration).

In SAM mode read transfers, the pointer is derived from an address accompanying the request for that transfer. In SAM mode write transfers, the pointer is derived from an address accompanying a SAM mode request immediately preceding the request for the write transfer.

It is understood that in the foregoing arrangement, data transfer interface 38 is connected only to the comm ctlr, data transfer interface 37 is connected to the comm ctlr and CPU's (and other entities such as the IOP of FIG. 2), and the storage control interface 39 is connected to the comm ctlr and CPU's (and other entities). It is understood further that storage access through path 39 is controlled so that coinciding requests from the comm ctlr and other entities are handled in a predetermined sequence.

4.2 Types of Storage Operations

The table in FIG. 6 lists presently relevant types of storage access requests that may be presented to the stge ctlr in the arrangement of FIG. 5, and associated operations that are performed by the stge ctlr in response to each request type.

Relative to FIG. 5, each request is presented to the stge ctlr via one or more of the CTL IN lines 39, and completion of each associated operation is acknowledged to the requesting entity by an acknowledgement signal asserted by stge ctlr 31 on a CTL OUT line at 39. Each request is accompanied by an address (addr) signal presented on ADDR IN lines at 39. The addr signals are translated by stge ctlr 31 into RAS (row address select) and CAS (column address select) signals as discussed earlier.

All but one of the operations listed in FIG. 6 involve a single cycle of request-acknowledge signalling between the requesting entity and the stge ctlr. The exception, a Read Modify Write transfer operation, involves 3 consecutive cycles of request-acknowledge signalling.

RAM mode operations relative to interface 37 are conducted in single request-acknowlege signalling cycles termed "Normal Read" (Rd) and "Normal Write" (Wr) cycles. Each such operation is initiated by a request presented by one of the entities connected at 39 (comm ctlr, CPU or IOP) and data (4bits in this figure) is transferred in parallel directly between the addressed row-column crosspoints of arrays 30 and the requesting entity via interface 37. the request. In a normal Rd, data is transferred from arrays 30 to the requesting entity (comm ctlr, CPU or other entity). In a normal Wr, data is transferred directly from the requesting entity to arrays 30.

Operations relative to interface 38 are conducted in request-acknowledge "Transfer" signalling sequences termed Read Transfers (RdT), Write Transfers (WrT), Pseudo-Write Transfers (PWrT), and Read-Modify-Write Transfers (RMW). Requests for such sequences are presented exclusively by the comm ctlr on CTL IN lines at 39, and acknowledged to the comm ctlr by signals returned on a CTL OUT line at 39.

Each RdT, WrT and PWrT Transfer operation involves a single cycle of request-acknowledge signalling between the comm ctlr and stge ctlr. The RMW sequence entails a succession of RdT, PWrT and WrT operations relative to a common row address in arrays 30. An RMW sequence is used to overwrite a selected part of the data stored in a specified RAM row (whereas a WrT operation that is not part of an RMW sequence is used to overwrite data in an entire RAM row).

In RdT operation, data is transferred in parallel from all storage cells in a selected RAM row to registers 33 (via connection 34, FIG. 5). In WrT operation, data is written in parallel to all storage cells in a selected RAM row from registers 33 (also via connection 34). The row selected for each parallel transfer is designated by a RAS value derived from address (addr) signals accompanying the respective request.

Each RdT operation is complete when data is transferred in parallel to registers 33. At completion of a RdT that is not part of an RMW sequence, the data held in registers 33 is transferred to the comm ctlr in a sequential mode (4 bits at a time in the indicated configuration). In the sequential transfer data is steered from successive positions in registers 33 to path 38 under direction of selection circuits 35. The sequential transfer begins at a register position designated by a pointer function, as described earlier.

In an RMW sequence, data transferred to registers 33 in the RdT subsequence is partially overwritten by data that is transferred to the registers from the comm ctlr in an associated WrT operation. The associated WrT concludes with a parallel transfer from the registers to the RAM row designated in the RdT.

In WrT operation, data is transferred to a designated RAM row in two steps; first, data is transferred sequentially from the comm ctlr to registers 33, and then data is transferred in parallel from registers 33 to the designated RAM row. In the transfer to registers 33, the comm ctlr presents the data at interface 38 sequentially (4 bits at a time in the indicated configuration), and the data is steered into successive positions in registers 33 starting at a position defined by a CAS-related pointer as noted above.

With one exception, each WrT request must be preceded by a PWrT request directed to a corresponding address. PWrT operation is used to condition path 35, 38 for input/write transfers. Path 35, 38 can only handle data transfers in one direction at a time. In its default condition (at startup or after any operation other than a PWrT or WrT) this path can only handle output transfers to interface 38. A PWrT is required to reverse this condition.

In PWrT operation, no data is transferred relative to arrays 30; however, data is usually transferred sequentially to registers 33 (from the comm ctlr) after acknowledgement of the PWrT request (by the stge ctlr) and before presentation of the next request (which is always a WrT as noted above). In the sequential transfer, the CAS associated with the PWrT address is used to establish a pointer function defining an initial position in registers 33. The sequential transfer begins at that position and progresses through successive register positions in a predetermined direction until either of two conditions occurs; i.e. until either the comm ctlr runs out of data to transfer or the end position of the registers is reached, whichever occurs first. In a WrT operation that is not part of an RMW sequence, the pointer value is usually 0 causing the sequential transfer to begin at one end of the registers and proceed towards the opposite end.

In an RMW sequence, the comm ctlr successively requests RdT, PWrT and WrT operations relative to one (row) address, waiting for acknowledgement of each request before initiating the next one. The RdT operation transfers data in parallel (512×4 bits in the indicated configuration) from a designated RAM row to registers 33. The PWrT prepares path 35, 38 for data input and establishes a pointer defining the starting position in registers 33 for a sequential input transfer. The latter transfer starts when the PWrT request is acknowledged, and the WrT request, which is presented as the sequential transfer is completed, causes the data in registers 33 to be transferred in parallel to the same RAM row as was designated in the RdT.

Since certain positions in registers 33 are not modified during the sequential transfer phase of the RMW sequence—namely, positions preceding the starting position defined by the pointer and following the last position filled in the sequential transfer—it is understood that data stored in corresponding positions in the RAM row addressed by the sequence will not be altered by the sequence (i.e. data in the corresponding positions will be transferred to registers 33 by the RdT, left unmodified by the sequential transfer, and rewritten to the same positions by the WrT). Thus, only data in other than the corresponding positions will be potentially modified by the sequence.

Details of the foregoing Transfer operations relative to sequential transfer interface 38 are explained next with reference to flow diagrams in FIGS. 7, 8 and 8A.

4.3 RdT Operations

RdT operations are used to transfer data in parallel from RAM storage to registers such as 33 (FIG. 5); generally, all data stored in a designated RAM row. In RdT operations that are not part of an RMW (read modify write) sequence, data held in the registers when the operation is completed (i.e. when the respective RdT request is acknowledged) is transferred to the comm ctlr sequentially (4 bits at a time). In RdT operations that are part of an RMW sequence, data in a selectable set of consecutive register positions is overwritten and register positions other than those in the selectable set are left unchanged.

Figure 7:
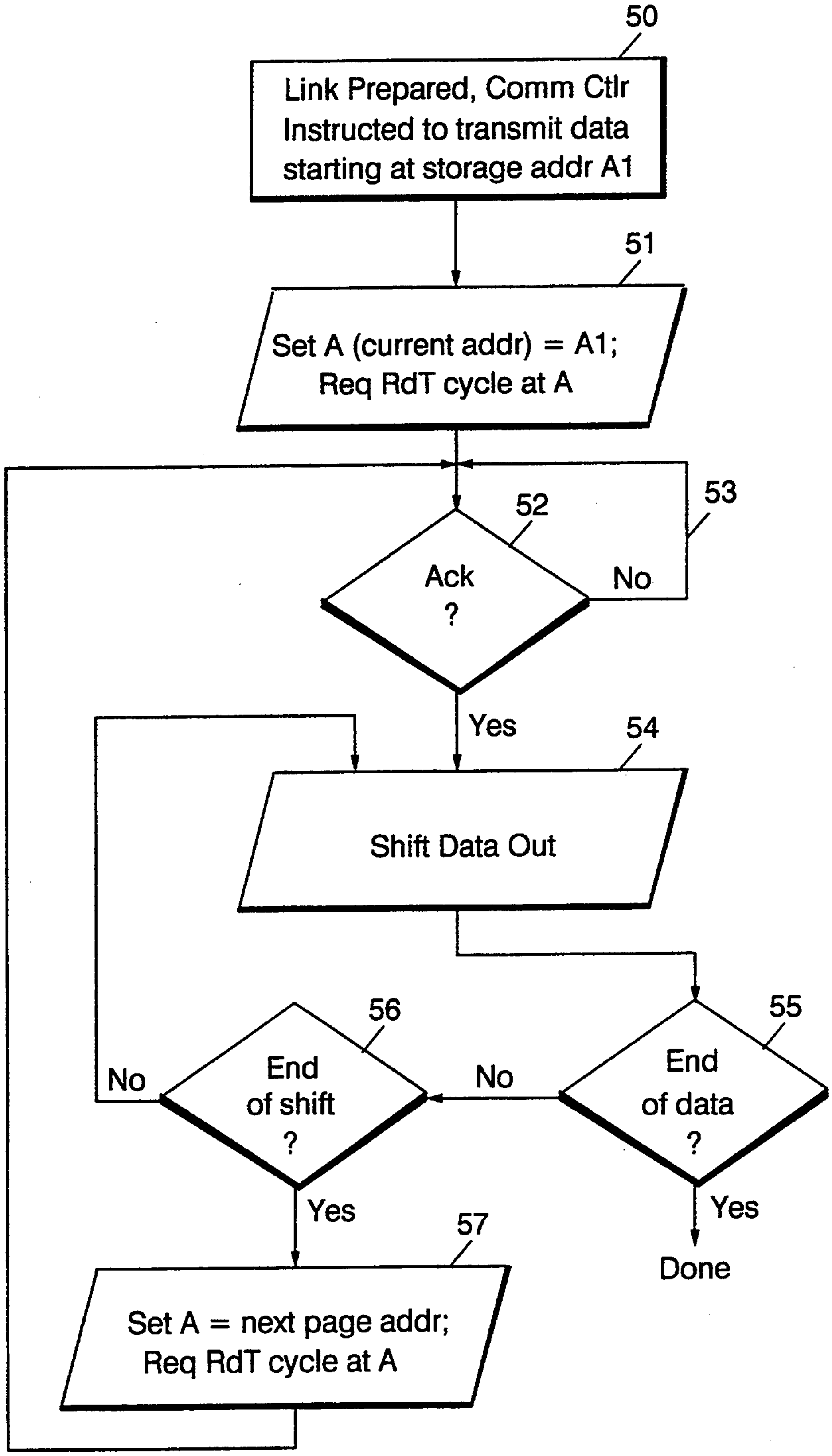
FIG. 7 is a flow diagram illustrating how the store shown in FIG. 5 is accessed through its serial port, by a communication controller shown in the same figure, for reading out data that the controller is transmitting over an external data communication link.

Details of how RdT operations that are not part of RMW sequences are invoked and used by the comm ctlr (relative to the basic storage configuration of FIG. 5), are indicated in the flow diagram of FIG. 7. In general, the comm ctlr uses this type of operation for reading out large blocks of data from storage; generally, data corresponding to information that is to be transmitted on an external communication link. As will be shown later, the comm ctlr uses normal Rd requests to retrieve information associated with short data packets that are being externally transmitted and to retrieve (request descriptors) defining communication processes/operations to be conducted by the comm ctlr.

As shown at 50 in FIG. 7, before a RdT operation is requested, the comm ctlr has initiated a transmission process on an external link. This means that the comm ctlr has retrieved a request descriptor from storage that defines that process (see later discussion of Descriptors), and performed actions required by that descriptor.

As explained later, each such descriptor is generated by an associated local CPU (a CPU in the same PE as the comm ctlr), written to storage by that CPU with normal Wr operations, and retrieved from storage by the comm ctlr with normal Rd requests. Among other things, the descriptor indicates the length of stored data to be transmitted and the address location A1 in storage of an initial byte of that data. As will be shown later, the comm ctlr will retrieve this data with either normal Rd requests or RdT requests; normal Rd's if the length is less than a predetermined threshold and RdT's otherwise. For the present discussion, assume that the length of data to be retrieved is sufficient for the comm ctlr to use RdT requests.

As shown at 51, the comm ctlr initiates retrieval of the data by setting an internal "current" address function A equal to the value of A1, and presenting a RdT request to storage relative to address A. The comm ctlr waits for acknowledgement of its request, as suggested at 52, 53, which it receives from the stge ctlr when data in a RAM row defined by A has been transferred in parallel to registers 33.

Upon acknowledgement of the request, the comm ctlr and circuits 35 cooperate to transfer data sequentially (4 bits at a time in the indicated configuration) from a series of consecutive positions in registers 33 to the comm ctlr. This transfer begins either at an end position in the registers or an intermediate position, depending upon the value of a pointer derived from A1 (by the stge ctlr) and proceeds through consecutive register positions towards the opposite end of the registers.

While this output transfer is being conducted, the stge ctlr is able to process other requests for (RAM mode) access to RAM's 30.

As indicated at 54–56 in FIG. 7, in the sequential transfer operation, data is transferred from consecutive register positions (4 bits at a time) until either a last unit (4 bits) of valid data is reached (as determined by the comm ctlr by progressively decrementing the length function of the associated descriptor with each unit transfer) or data at the opposite end of the registers is transferred (as indicated to the comm ctlr by circuits 35).

More specifically, after each 4-bit transfer (operation 54), the comm ctlr determines at 55 if a last unit of valid data has been retrieved; i.e. if the field length factor of the associated descriptor has been exhausted. This presumes that in normal circumstances the internal data storage capacity in the comm ctlr and the rate of external transmission are sufficient to handle the entire length of data specified in each descriptor. If determination 55 is positive the operation ends, but otherwise the operation continues with determination 56.

Determination 56 establishes whether or not data in the last (opposite end) position in registers 33 has been transferred (based on interaction between selector circuits 35 and the comm ctlr). If the last register position has not been reached ("N" determination at 56), operation 54 is repeated to transfer a next unit of data from the registers. If the last register position has been transferred ("Y" determination at 56), operation 57 is performed.

In operation 57, the comm ctlr modifies current address A, to a value designating the next row position in RAM's 30, and presents another RdT request to storage relative to that address. This causes data to be transferred in parallel from the next row to registers 33 and sequential transfer actions 54–56 to be repeated; again until either a last unit of data has been transferred to the comm ctlr or data in a last register position has been transferred.

Accordingly, by one or more RdT operations, the comm ctlr retrieves all of the data in a storage space specified by the associated request descriptor, and conducts a real time transmission process on its external links to transmit that data to a remote station.

4.4 WrT, PWrT and RMW Operations

Details of how Write Transfer (WrT), Pseudowrite Transfer (PWrT) and Read Modify Write Transfer (RMW) operations are used relative to the basic storage configuration of FIG. 5 are explained with reference to flow diagrams in FIGS. 8 and 8A.

As implied at 60, such Write Transfer operations are evoked when the comm ctlr has been prepared for a communication reception process and has received data in that process (from a remote station via its link connection) which must be written to storage. As noted later, the comm ctlr uses WrT and RMW operations only when storing received data of at least a predefined threshold length, and otherwise uses normal Wr operations for storing such data.

It is understood that the comm ctlr has internal buffer storage capacity sufficient to store an amount of data corresponding to at least the threshold length, so that WrT and RMW operations need not be initiated until at least that amount of received data is immediately available to be written. It is understood also that request descriptor information defining the reception process has provided the comm ctlr with the beginning address "A1" of a buffer space in VRAM storage into which the received data is to be written. Assuming that received data is to be written via a WrT (or RMW) operation, the comm ctlr sets a current address parameter A to the value A1 corresponding to the above-mentioned beginning address, and proceeds with determination 62.

At 62, the address represented by A1 is evaluated to determine its offset or alignment relative to physical page boundaries in VRAM. For the present discussion, a page contains a number of bits corresponding to the capacity of a VRAM row (512×4 bits in the configuration of FIG. 5; 512×32 bits in a configuration described later). Each address contains an ordered set of digits. Addresses associated with separately addressable storage cells within one row have a subset of high order digits which is the same for all positions in that row and a subset of low order digits which are different for each addressable row position.

Relative to determination 62, an address is deemed aligned if the digits in its low order subset are all 0, and unaligned otherwise. If the current address is not aligned, a no branch is taken at 62 to an RMW operation sequence 70 discussed later. If the current address is aligned, a yes branch is taken at 62 to determination 63.

At 63, the comm ctlr determines if data currently available to be written to storage is or is not shorter than a page (512×4 bits). If the available data is at least a page long, the N branch is taken at 63 to operations 64–69. If the available data is shorter than a page, the Y branch is taken at 63 to RMW sequence 70, discussed later.

In operations 64–66, the comm ctlr presents a request for a PWrT operation relative to current address A, waits for acknowledgement of that request and transfers received data sequentially to registers 33. Since the operation is relative to an aligned address and the amount of data being written is at least a page long (in view of determinations 62 and 63), the sequential transfer will fill all positions in register 33; i.e. begin at one end of the registers (based on a 0 valued pointer developed at 36), and proceed through successive positions to the opposite end. At completion of this sequential transfer, the comm ctlr presents a request for a WrT operation relative to a page aligned address A* corresponding to A (A* designates the beginning of the row designated by A, and is the same as A if A is page aligned), and waits for acknowledgement of that request.

Upon acknowledgement of the WrT request (which the stge ctlr provides when the data contained in registers 33 has been transferred in parallel to the row designated by A*), the comm ctlr determines at 67 if all available data has been transferred to storage. If all available data has been transferred the operation ends, but otherwise the operation continues with successive actions 68 and 69.

At 68, current address A is set to a value designating the beginning of the next physical page/row, and at 69 the comm ctlr determines if the length of data remaining available to be transferred to storage (the length of data originally available less the length of data transferred in the last WrT operation 66) is shorter than a page/row. If the remaining data is at least a page length, sequence 65–67 is repeated. If the remaining data is shorter than a page, operation 70 is performed to execute an RMW sequence.

Note that in this repetition of operations 65–67 the WrT request presented at 66 does need not be preceded by a PWrT operation (i.e. operation 64 is not required). This is because at the time of determination 69 transfer path 38, 35 (FIG. 5 is conditioned for an input operation starting at a lowest order position in registers 33 (since sequence selector 35 operates in a circular sequence and the register was filled in the previous transfer 65).

If the determination at 62 had been that the current address is not aligned, or the determination at either 63 or 69 had been that data to be written is shorter than a page, the comm ctlr would have selected operation 70 to initiate an RMW (read modify write) sequence in order to write data to a portion of the addressed row without modifying data in other parts of the same row.

In the RMW sequence, the comm ctlr presents successive requests for RdT, PWrT and WrT operations relative to the same row address. The PWrT request is presented when the RdT request is acknowledged, and the Wrt request is presented after the PWrT request has been acknowledged and after data has been transferred sequentially to registers 33 from the comm ctlr.

Note that when operation 70 is reached through decision 62, the current address is offset from the page boundary. Accordingly, in that situation, the stge ctlr will establish a pointer value with a corresponding offset, and the sequential transfer to registers 33 will begin at a position correspondingly offset from the "lowest order" end position. Hence, in this case, positions in registers 33 between the lowest order and beginning positions will not be altered by the sequential transfer, and data in corresponding positions of the addressed row will not be altered in the WrT operation.

Note further that when operation 70 is reached through either determination 63 or 69, the current address is aligned (pointer is 0) but data available to be written is shorter than a page in length and therefore will not fill all positions in registers 33. Therefore, in this situation, the sequential transfer of the RMW sequence will fill less than all positions in registers 33 beginning at the lowest order end position. Therefore data in positions of the addressed RAM row corresponding to the unfilled positions in registers 33 will not be altered in the final WrT part of the RMW operation.

Figure 8:
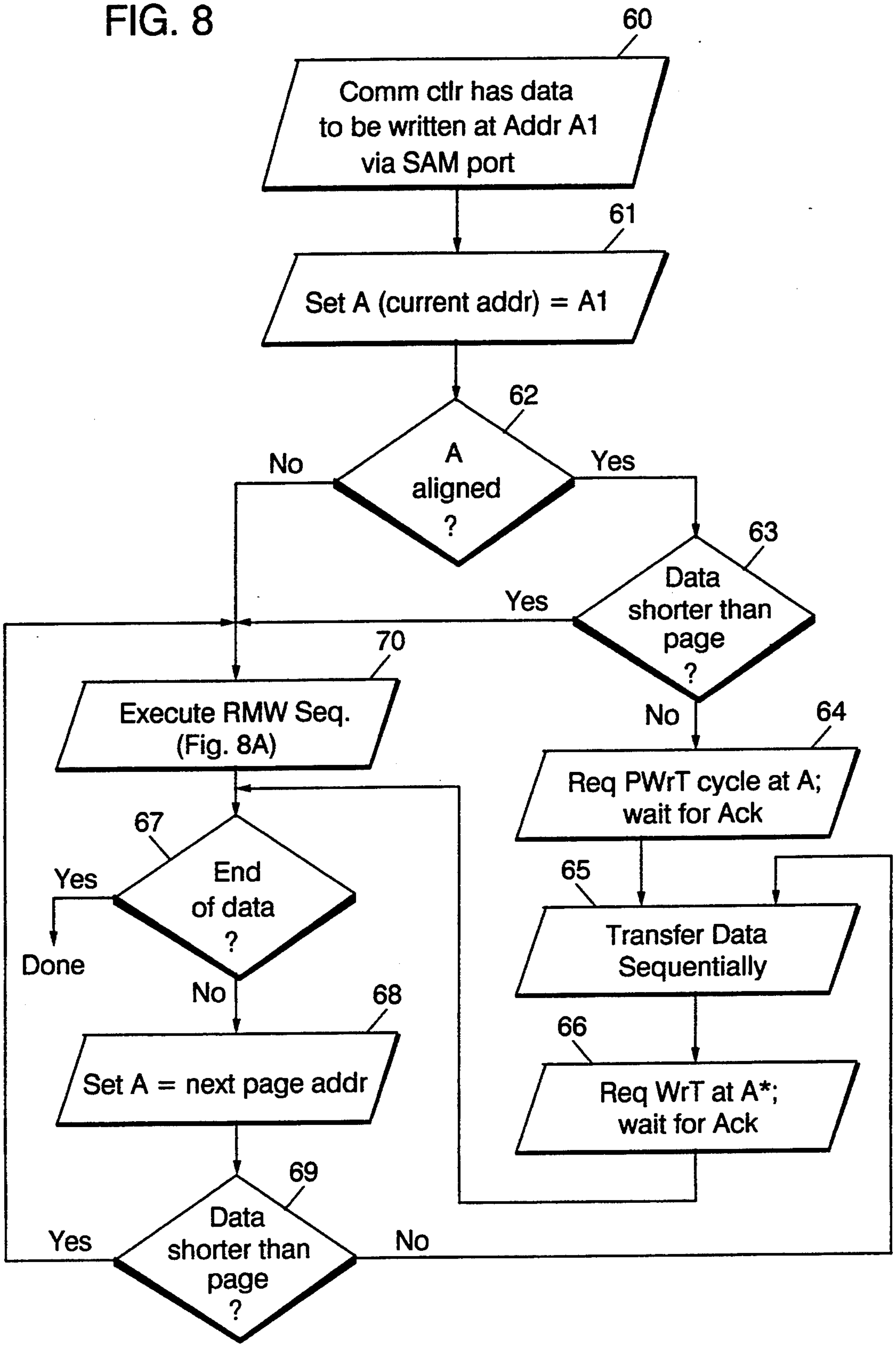
FIG. 8 is a flow diagram illustrating how the store of FIG. 5 is accessed through its serial port, by the communication controller shown in the same figure, for writing data to storage that is being received by the controller from an external data communication link.
Figure 8A:
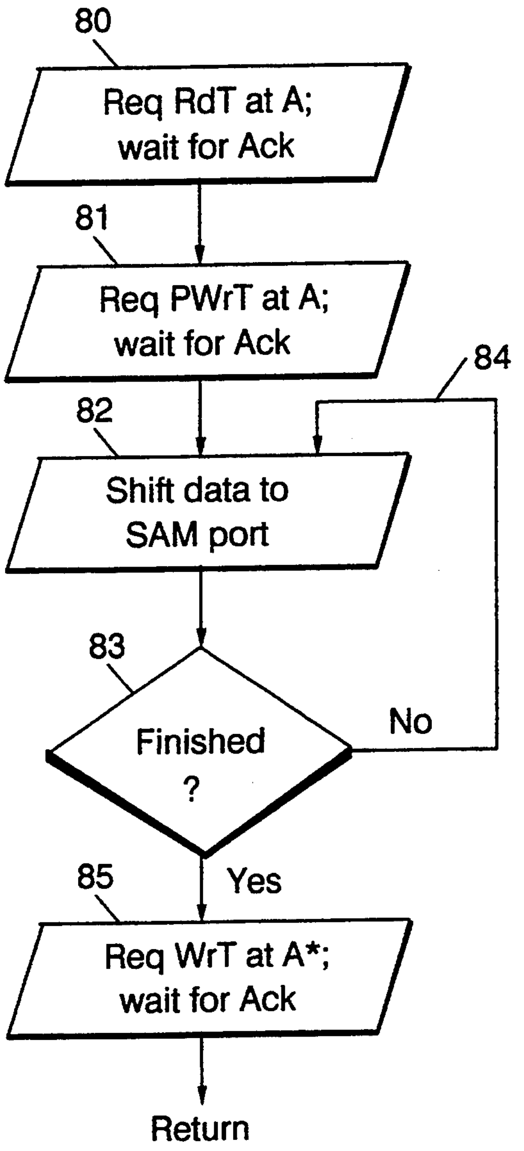
FIG. 8A shows details of a Read Modify Write sequence illustrated as a single operational item in FIG. 8 but actually involving three discrete "request/acknowledgement" cycles of interaction between the communication controller and storage.

Details of operations 70, and the RMW sequence of storage operations invoked thereby, are illustrated in FIG. 8A. As shown at 80, the comm ctlr starts these operations by presenting a request for a RdT operation to storage, relative to its current address A. When that request is acknowledged by the stge ctlr (i.e. when data in the addressed row has been transferred in parallel to registers 33), actions 81 are invoked. In actions 81, the comm ctlr presents a PWrT request to storage relative to the same current address A and waits for acknowledgement of that request (while the stge ctlr prepares the sequential transfer path for an input transfer).

At acknowledgement of the PWrT request, the comm ctlr iteratively performs action loop 82–84, to transfer data sequentially to registers 33, until determination 83 indicates that the transfer is "finished".

Determination 83 actually involves determinations corresponding functionally to decisions 55 and 56 in FIG. 7; i.e. determination that either all data to be transferred has been exhausted or that a last position in registers 33 has been filled without exhaustion of the available received data. If neither condition is detected operation 62 is repeated (a next unit of data is transferred to the registers). If either condition is detected, the comm ctlr ends the sequential transfer and performs action 85.

AT 85, a WrT request is presented to storage relative to page aligned address A* (equal to current address A if A is aligned, and designating the beginning of the same page as A otherwise), and upon acknowledgement of that request by the stge ctlr (which occurs when the data in registers 33 has been transferred in parallel to the row designated by A*), the sequence returns to the exit position shown in FIG. 8; i.e. to the "end of data" determination 67 of that Figure (which is not redundant relative to the "finished" determination made at 83, since the sequential transfer 82 may be finished before last data is written).

Note that when foregoing actions 80–85 are initiated from decision point 62 in FIG. 8, current address A is offset from a page boundary (not aligned), and the associated sequence pointer will designate a correspondingly offset positions in registers 33 for starting the sequential transfer of loop 82–84. Hence, in this case, information read out in operation 80 to positions in registers 33 between the lowest order position and the offset/starting position will not be altered by the sequential transfer and corresponding information in the addressed RAM row will not be altered by the following WrT transfer 85.

Note also that if the sequential transfer is finished before the highest order position in registers 33 is filled, data in register positions not filled will not be changed by the sequential transfer and data in corresponding positions of the addressed row will not be changed by the WrT 85. This can happen if the address is unaligned (N exit at 82 in FIG. 8) and the received data length is too short to fill all positions in registers 33 starting at the pointer offset position. It also can occur if the address is aligned and data is shorter than a page (decision 63 or 69, FIG. 8).

4.5 Transfer of Process Control Information

The following discussion is intended to convey an understanding of how control information associated with communication processes is transferred between CPU's and the comm ctlr. In the system presently contemplated, this information comprises "Descriptor" structures of predefined form; including Transmit Request Descriptors which define handling of Transmit Data relative to storage and remote PE's/stations, Receive Request Descriptors which define handling of Receive Data sent by remote PE's relative to storage, and Status Descriptors which define final status of communication processes served by the comm ctlr.

In the preferred embodiment, these descriptors are transferred through storage; Request Descriptors being written to predefined storage spaces by CPU's and read by the comm ctlr, and Status Descriptors being written to predefined spaces by the comm ctlr and read by CPU's. For reasons explained below, it is preferred that the comm ctlr read and write the descriptors only by means of normal Wr and Rd operations.

Receive Request Descriptor structures are stored at system startup relative to each remote PE/station capable of sending Receive Data to the local comm ctlr. Transmit Request Descriptors are stored when data Transmit Data is prepared in storage for transmission by the local comm ctlr to a remote PE. The comm ctlr repeatedly polls the storage space allocated for Transmit Descriptors to detect when new transmission processes are required.

Figure 9B:
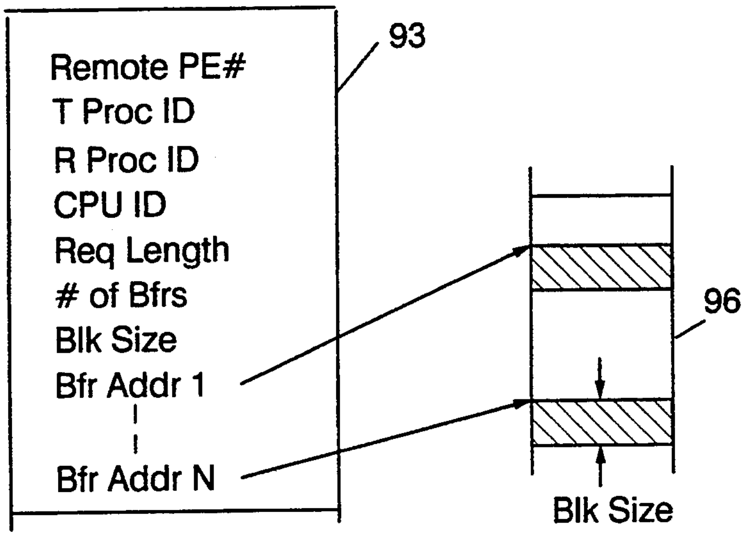
FIGS. 9A and 9B respectively detail information parameters in Transmit Request Descriptors and Receive Request Descriptors shown generally in FIG. 9.
Figure 9:
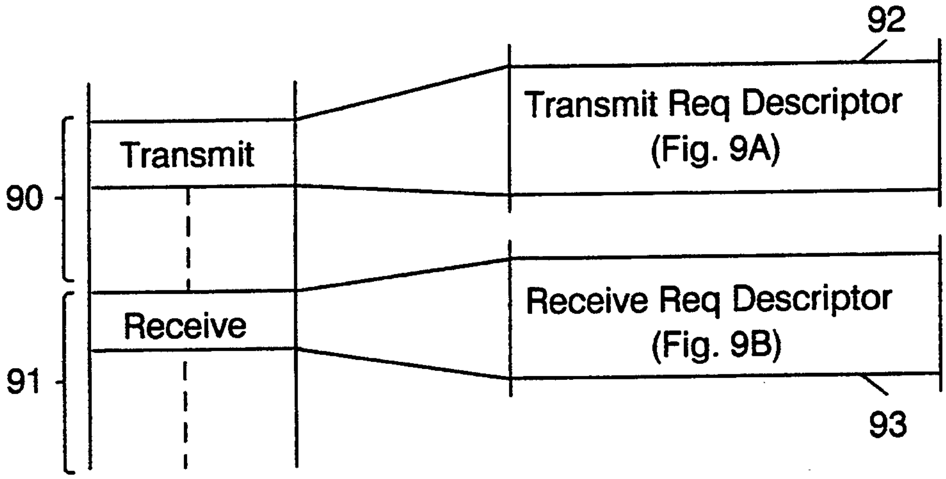
FIG. 9 shows allocation of memory space for request descriptors defining transmission and reception processes of a communication controller configured to use memory in accordance with the present invention.

As indicated in FIG. 9, Transmit and Receive Request Descriptors are stored in respective pre-allocated spaces 90 and 91. A typical Transmit Request Descriptor is suggested at 92 in FIG. 9 and indicated in detail at 92 in FIG. 9A. A typical Receive Request Descriptor is suggested at 93 in FIG. 9 and shown in detail at 93 in FIG. 9B.

Figure 9A:
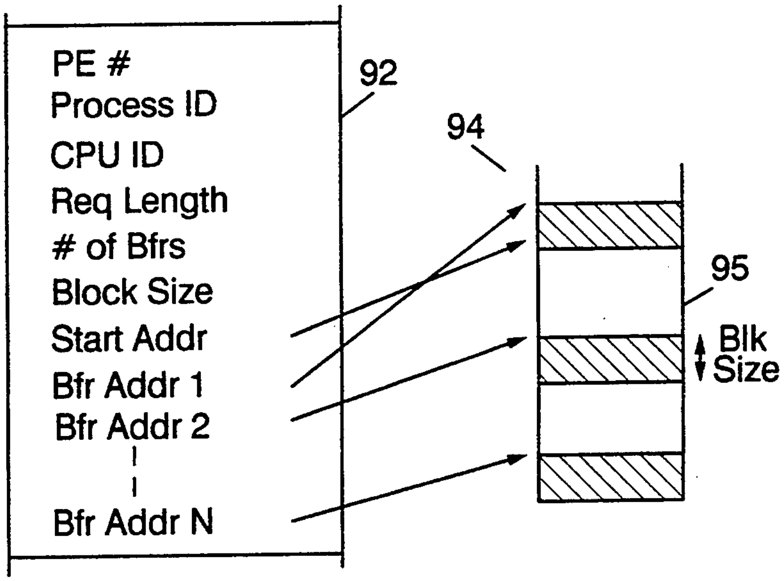

As shown in FIG. 9A, each Transmit Request Descriptor contains information fields designated: PE #, Process ID, CPU ID, Request (Req) Length, # of Buffers (Bfrs), Block Size, Start Address, and one or more Buffer Address (Bfr Addr) values. These terms have the following meanings. PE #: identifies the PE (Processing Element) to which associated Transmit Data is to be sent.

Process ID: is a number uniquely assigned to the associated process.

CPU ID: identifies the CPU which originated the respective descriptor.

Req Length: indicates the total length of associated Transmit Data.

#of Bfrs: indicates the number of storage blocks in which the associated Transmit Data is stored. These blocks (see shaded sections 94, FIG. 9A are of equal size (see Block Size, below). Successive blocks need not be contiguous.

Bfr Addr: indicates initial addresses of individual storage blocks containing associated Transmit Data.

Block Size: indicates the size of the storage blocks (all blocks defined by one Descriptor have the same Block Size. Block Size is indicated graphically at 95 (FIG. 9A).

Start Addr: indicates an address in the first storage block (the buffer space whose address is designated by Bfr Addr 1), at which the first byte of Transmit Data is held. When different from Bfr Addr 1, this function allows the CPU to arbitrarily offset the Transmit Data within that block and leave preceding space in the block for storage of special information not relevant to the present invention.

FIG. 9B shows that each Receive Request Descriptor contains fields designated: Remote PE #, Transmit (T) Process (Proc) ID, Receive (R) Proc ID, CPU ID, Request (Req) Length), # of Bfrs, Block (Blk) Size and one or more Buffer Address values 1—N. These terms have the following significance.

Remote PE#: identifies a remote source of associated Receive Data. A Receive Request Descriptor is stored locally for each remote station, and contains a Remote PE# identifying that station.

R Proc ID: a number uniquely assigned to the associated data reception process.

T Proc ID: a Process ID value of a local origin transmission process terminating at the remote station (equals the Process ID value in a locally stored Transmit Request Descriptor that defines the local origin process, and is used by the local comm ctlr for locating that Descriptor in its storage). Together, the R Proc ID and T Proc ID define a full duplex communication process between the local and remote stations.

CPU ID: the identity of a local CPU to which associated Receive Data is to be directed. If any CPU can process the data, this field is left blank.

# of Bfrs: the number of discrete continuous blocks of storage which contain the respective Receive Data; these spaces—see shaded spaces in FIG. 9B—may be either contiguous or non-contiguous.

Blk Size: the size of each space; see 96, FIG. 9B.

Bfr Addr: the address of an initial location in each space.

Figure 10:
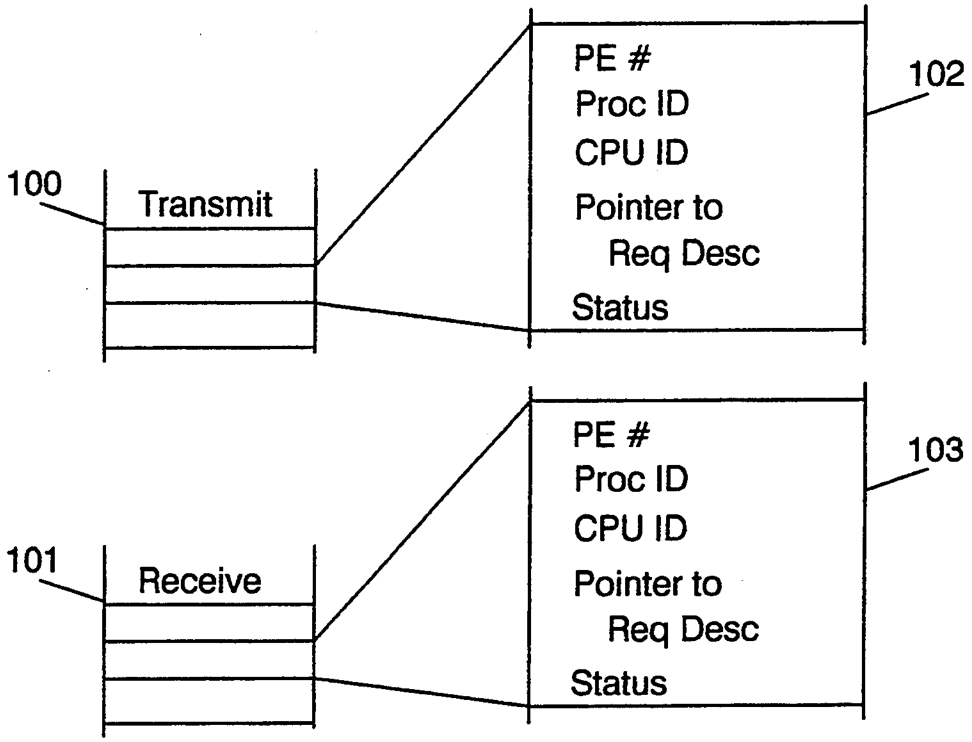
FIG. 10 shows allocation of memory space to the communication controller for enabling the controller to communicate status of assigned communication tasks to a data processing system assigning the tasks.

Transmit and Receive Status Descriptors (FIG. 10) respectively indicate final status of associated transmission and reception processes. Table spaces 100 and 101 are respectively allocated for these functions, and the information conveyable by Transmit Status and Receive Status Descriptors are indicated respectively at 102 and 103. Each Status Descriptor space (both Transmit and Receive) has specifically named fields having the following significance.

PE #: identifies the local Processing Element in which the associated process is being executed.

CPU ID: identitifies the local CPU that originated the associated Request Descriptor.

Proc ID: a number uniquely assigned to the respective transmission or reception process.

Pointer: the starting address of a buffer storage space containing the Request Descriptor of the associated process.

Status: Information defining final status of the respective process (completed/aborted, error, etc.).

4.6 Selective Use of RAM/SAM Storage Access Modes

Request and Status Descriptors are written to storage by normal (RAM mode) Wr requests and read from storage by normal Rd requests. Request Descriptors are originated and written by CPU's and read by the comm ctlr. Status Descriptors are written by the comm ctlr and read by CPU's.

Storage transfers of Transmit Data and Receive Data are handled differently. In these transfers, the comm ctlr selectively requests normal Rd/Wr operations (Rd for Transmit Data, Wr for Receive Data) or RdT/WrT/RMW operations (RdT for Transmit Data), depending upon length factors derived from respective Transmit/Receive Request Descriptors.

Advantages of having the comm ctlr handle storage transfers of Descriptor information and certain data by normal Rd/Wr requests and storage transfers of other data by RdT/WrT/RMW operations are explained below.

With respect to Descriptors (Transmit Request Descriptors, Receive Request Descriptors, and Status Descriptors), it is noted that in a preferred embodiment of the invention to be described with reference to FIG. 12, only a portion of the addressible storage space is accessible in SAM mode, and it is desired for reasons to be made apparent that Descriptors and certain other information be stored in the space not addressible in SAM mode (other information including information unrelated to communication processes served by the comm ctlr).

With respect to communicated data, consider first the storage handling of Receive Data. The longest latencies/delays in such handling are encountered when writing the data with SAM mode RMW operation (to store the data in less than a full RAM row without altering data in other parts of the row, as explained earlier). Delays associated with such RMW actions include times allowed for performance of the individual RdT, PWrT and WrT actions in storage, time required to sequentially load data into the VRAM shift register between the PWrT and WrT operations, and any time that must be allowed for priority storage service to CPU's and other entities when such services coincide with or overlap comm ctlr requests for the RdT, PWrT and WrT operations.

The preferred storage configuration to be described (relative to FIG. 12) can handle direct transfers in parallel of 4 bytes (32 bits) per normal Wr request (from the comm ctlr or any other entity) and allows for a burst mode of operation enabling the comm ctlr (and other entities) to transfer up to 32 bytes (256 bits) in a time not much longer than a single request-acknowledge cycle. Thus, relative to that configuration, it is obviously inefficient to have the comm ctlr use WrT type operations for writing fewer than 32 bytes. Furthermore, considering the delays associated with RMW operations, design calculations indicate that relative to the same storage configuration, it would be inefficient to use RMW operation for writing fewer than 80 bytes (480 bits) relative to a single row address. Thus, it is desirable to use normal Wr's to store Receive Data strings shorter than 80 bytes relative to any RAM row, and RMW or WrT/PWrT operations to store longer strings of Receive Data in any row.

Since Status Descriptors (which contain from 30 to 36 bytes) are preferably stored in a portion of storage space not accessible in SAM mode (relative to the preferred storage configuration) these Descriptors are preferably stored only by means of normal Wr's.

Similar relative timing factors apply to retrieval of Transmit Data from storage. Since worst case delays in RdT operations are considerably less than in RMW operations, the threshold for selecting between normal Rd and RdT actions will be less than the above threshold for selecting RMW access (80 bytes). Design considerations relative to the preferred storage configuration indicate that it is preferable to use normal Rd's when reading fewer than 36 bytes (288 bits) from a single RAM row, and RdT operations when reading longer strings from a row.

Also, note again that since (Transmit and Receive) Request Descriptors are preferably stored in a portion of addressible storage space that is not accessible in SAM mode, in the preferred storage configuration, these Descriptors must be read by normal Rd's relative to that configuration.

Figure 11:
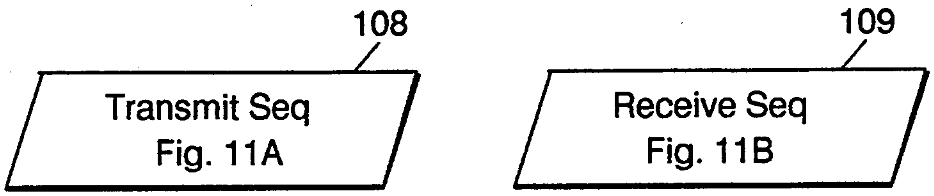
FIG. 11 indicates the control sequences performed by a communication controller for conducting transmission and reception processes in accordance with the present invention.
Figure 11A:
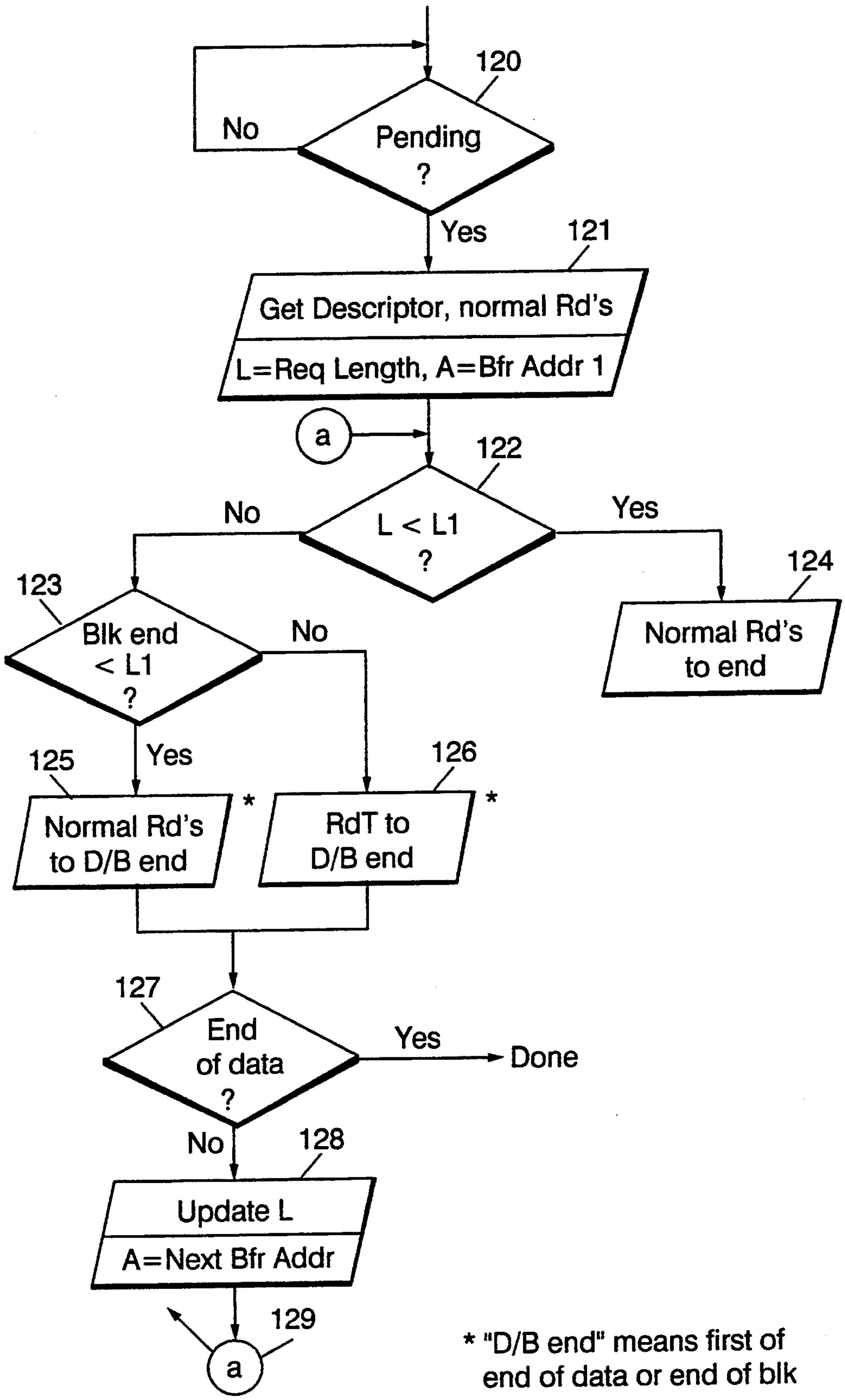
FIGS. 11A and 11B respectively detail constituents of Transmit and Receive control sequences shown gengerally in FIG. 11.
Figure 11B:
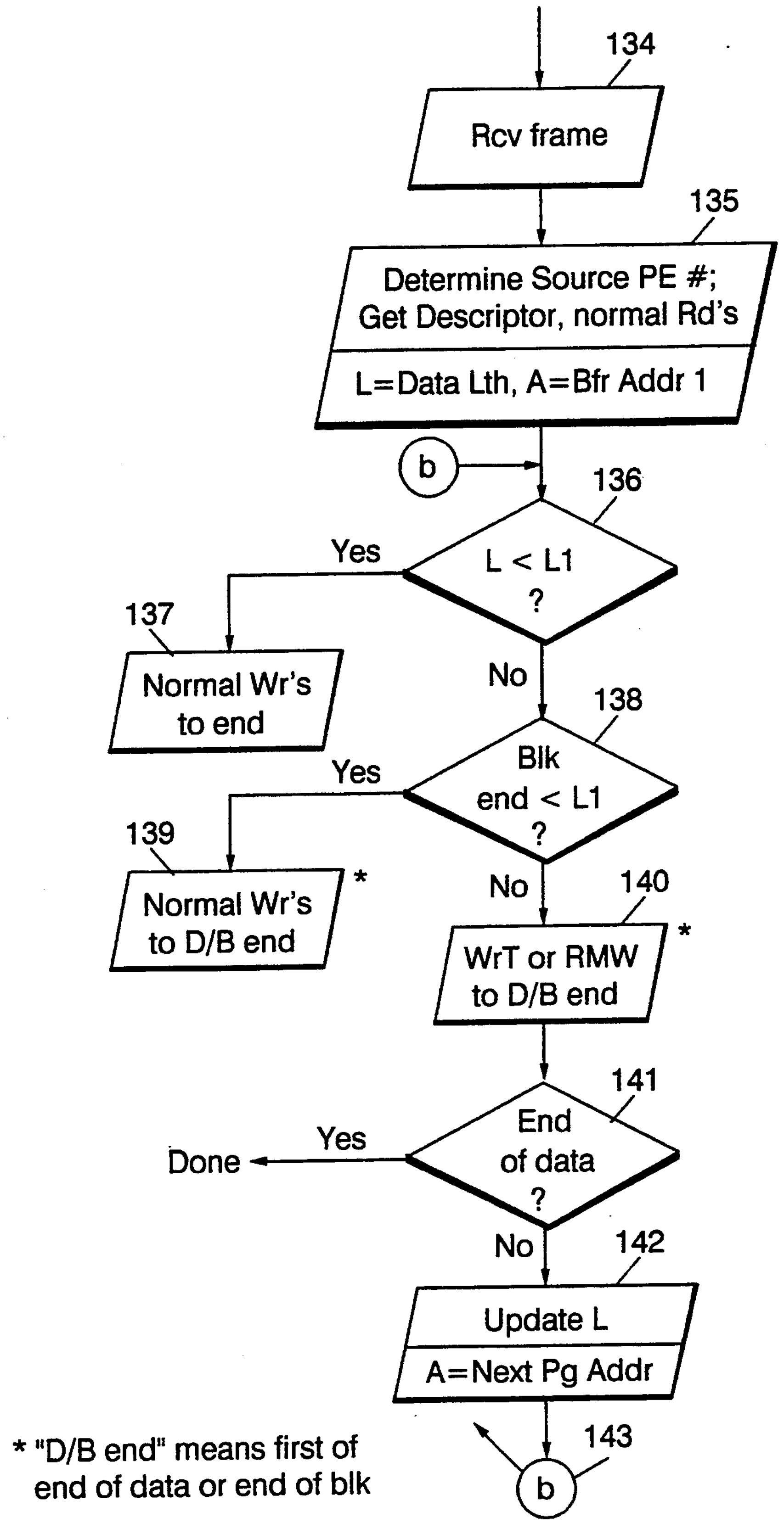

Sequences of comm ctlr operations relative to storage are indicated in FIGS. 11, 11A and 11B. These illustrate actions by which modes used by the comm ctlr to access storage are selected. Sequences associated with data transmission processes are indicated in block outline at 108 in FIG. 11 and in detail in FIG. 11A. Sequences associated with data reception processes are shown in block outline at 109 in FIG. 11 and in detail in FIG 11B.

Sequences described in the next two subsections are readily implementable in state machine logic, or equivalent logic arrangements, by application of logical design practices well understood by those skilled in the data communication arts.

4.6.1 Storage Mode Selection—Transmit Processes

For accessing storage relative to data transmission processes (FIG. 11A), the comm ctlr idles in waiting loop 120 when it has no immediate tasks to perform. When a transmit process is activated (Transmit Request Descriptor stored by a local CPU, and associated Transmit Data stored in one or more Bfr Spaces designated in the Descriptor), the comm ctlr retrieves the Descriptor, uses it to fetch associated Transmit Data from storage blocks designated in the Descriptor, and transmits that data to the remote PE designated in the Descriptor. The transmission may coincide with the storage access process, but in accordance with common practice the data may be briefly held in buffer registers within the comm ctlr, in order to synchronize its transmission to timing requirements of the external link and remote PE.

As indicated at 121, the comm ctlr retrieves the (Transmit Request) Descriptor by means of normal Rd requests, sets a local register L (for Length indicator) to the value of the Request Length field in the Descriptor, and sets a local register A (current address) to "Bfr Addr 1" field (reference FIG. 9A discussed above). It should be understood that each descriptor contains multiple bytes of information (see Fig. 9A) which may require multiple normal Rd request operations for retrieval.

As noted earlier, the comm ctlr selectively uses normal Rd requests or RdT type requests to retrieve Transmit Data. The request mode selection is based on length comparisons made at 122–123 in FIG. 11A.

At 122, the comm ctlr compares the Req Length value now in register L to threshold length L1 (e.g. L1=36 bytes as noted above). If L is not less than L1, comparison 123 is made. If L is less than L1, operations 124 are performed.

At 124, all of the Transmit Data to be read is retrieved by normal Rd's. This means of course that normal Rd requests will be requested and performed relative to a string of consecutive addresses beginning at A until either all data has been read or data has been read from an end of block position, and in the latter case A would be advanced to the next Bfr Addr (e.g. Bfr Addr 2) and normal Rd's continued relative to remaining data to be read, through a string of successive addresses beginning at the next Bfr Addr and terminating at end of data.

At 123, byte length to the end of the block currently being addressed is compared to L1. This length can be less than L1 if either: a) Blk Size (see FIG. 9A) is less than L1, or 2) the Start Addr (FIG. 9A) is offset from a block boundary and byte length from the Start Addr to the end of the block is less than L1. If the length to block end is less than L1, operations 125 are performed, and otherwise operations 126 are performed.

At 125, normal Rd's are used to fetch Transmit Data from the block designated by the value of A set at 121 to "D/B end". As indicated in the footnote in FIG. 11A, "D/B end" means the first reached of end of data or end of (currently addressed) block; i.e. the end of data if that lies within the currently addressed block, or the end of block otherwise.

At 126, one or more RdT requests is(are) used to read data from one or more rows/pages in VRAM to "D/B end" as just defined. Thus, a RdT operation will be used to transfer Transmit Data in SAM mode, from (all or part of) the VRAM row/page containing the beginning of the block currently being addressed to the comm ctlr, and if the currently addressed block extends beyond the addressed row, and contains Transmit Data extending beyond the row, an additional RdT operation will be performed relative to the next row (with values of L and A adjusted for that operation) . These operations terminate when end of data is reached (i.e. either within the first row or a subsequent row depending upon the block length, etc. ).

Action 125 or 126 is followed by end of data determination 127. If end of data was reached in the previous action, the sequence is finished ("done"). If end of data was not reached, values of L and R are updated in operations 128 and the sequence is repeated relative to these values via the circled "a" connection 129 to determination action 122. In the just mentioned update, L is changed to indicate the remaining length of data to be read (the Req Length less the data so far read) and A is changed to the value of next Bfr Addr 2 (i.e. the address at which the next block begins).

These actions continue until all of the Transmit Data defined by the Descriptor parameters (Req Length, Block Size, Bfr Addr 1, 2, . . . ) has been retrieved. It is of understood of course that this same Transmit Data is being transmitted by the comm ctlr to a remote station (defined by the "PE #" parameter in the Descriptor), and that such transmission will be performed generally in time coordination with the storage retrieval process. This further handling of the Transmit Data is not relevant to the present invention.

4.6.2 Storage Mode Selection—Receive Processes

Storage mode selection for Receive Processes is shown in FIG. 11B. When a remote PE starts to transmit data to the local PE (action 134), the local comm ctlr performs actions 135 to retrieve an associated locally stored Receive Request Descriptor (defined by the PE # value in the Descriptor; see FIG. 9B) and to set values in local registers L (data length) and A to be used for initiating operations to write associated Receive Data to storage. A (which may be separate from the register A associated with transmit processing; reference 121 FIG. 11A) is set to the value of Bfr Addr 1 given in the Descriptor.

As noted earlier, at start up of each PE system, a Receive Request Descriptor is prepared and stored in association with each remote PE to which the local PE will be linked for communication. When a remote transmission to the local station begins, information is sent identifying the source PE, and the length of data to be sent. That information is used for locating the associated Descriptor in storage and for updating the respective Request Length field of that descriptor to indicate the communicated length value. This length value is also set into register L in operations 135.

Each Receive Request Descriptor contains information indicating the number, size and initial addresses of discrete storage blocks currently allocated for storage of data relative to the associated remote PE. That information may be varied dynamically as incoming messages from the remote PE are analyzed by local CPU's.

After actions 135, determination 136 compares L to threshold value L1. As noted earlier, the value of L1 for receive processing may be different from the value of L1 used for transmit processing. The receive threshold for selecting between normal Wr and WrT or RMW operations is determined by storage access latencies/delays associated with WrT and RMW operations. Since these latencies are larger for writing to storage in SAM mode than reading from storage in that mode, the value of L1 at 136 in general would be larger than the corresponding value used at determination 122 (FIG. 11A).

If L is less than L1, determination 121 branches to operations 137, causing normal Wr requests to be issued relative to a series of addresses beginning at A and continuing until all of the Receive Data is stored. This means of course that A will be progressively modified as individual units of Receive Data are stored, until either the last unit of data is stored or a block is filled. It means also that if a last space in a block is filled, and more data remains to be stored, A will be updated to the next Bfr Addr (e.g. Bfr Addr 2) and the normal Wr's will be continued into the next block.

If L is not less than L1 determination 136 branches to determination 138. At 138, the bit length from the location addressed by A to the end of the block containing that location is compared to L1. If this "length to block end" is less than L1, normal Wr operations are initiated relative to successive addresses (starting at the current address A) and continuing until the first of "end of data" or "end of block" is reached.

If length to block end at 138 is not less than L1, operations 140 are performed. At 140, SAM mode WrT or RMW operations are performed to write Receive Data to a series of consecutive locations in the RAM row/page containing Bfr Addr 1 (the current value of A after step 135). If Bfr Addr 1 is page aligned (refer to earlier discussion of FIG. 8) and the data to be stored is sufficient to fill the row, a WrT operation is requested relative to current address A. If Bfr Addr 1 is not page aligned, or the associated Bfr block ends at a position before the end of the row, or the data to be stored is of insufficient length to fill the remainder of a block or row, a RMW sequence is performed (to store the data without altering previously stored data that is not aligned with the data being stored).

After operations 140, "end of data" determination 141 is made. If all Receive Data has been stored in operation 140, the comm ctlr sequence ends at 141. Otherwise, the sequence continues with operations 142. At 142 values of L and A are updated (L to the length of Receive Data remaining to be stored, and A to the next Bfr Addr), and the sequence beginning at determination 136 is repeated relative to the remaining data.

5. Alternative Storage Configurations

The following sections are intended to describe alternatives to the storage arrangement shown in FIG. 5; particularly, alternative arrangements which provide VRAM usage in accordance with the invention while offering economies of storage—relative to the arrangement of FIG. 5—in connection with storage of information other than Receive Data and Transmit Data.

5.1 Preferred Configuration

Figure 12:
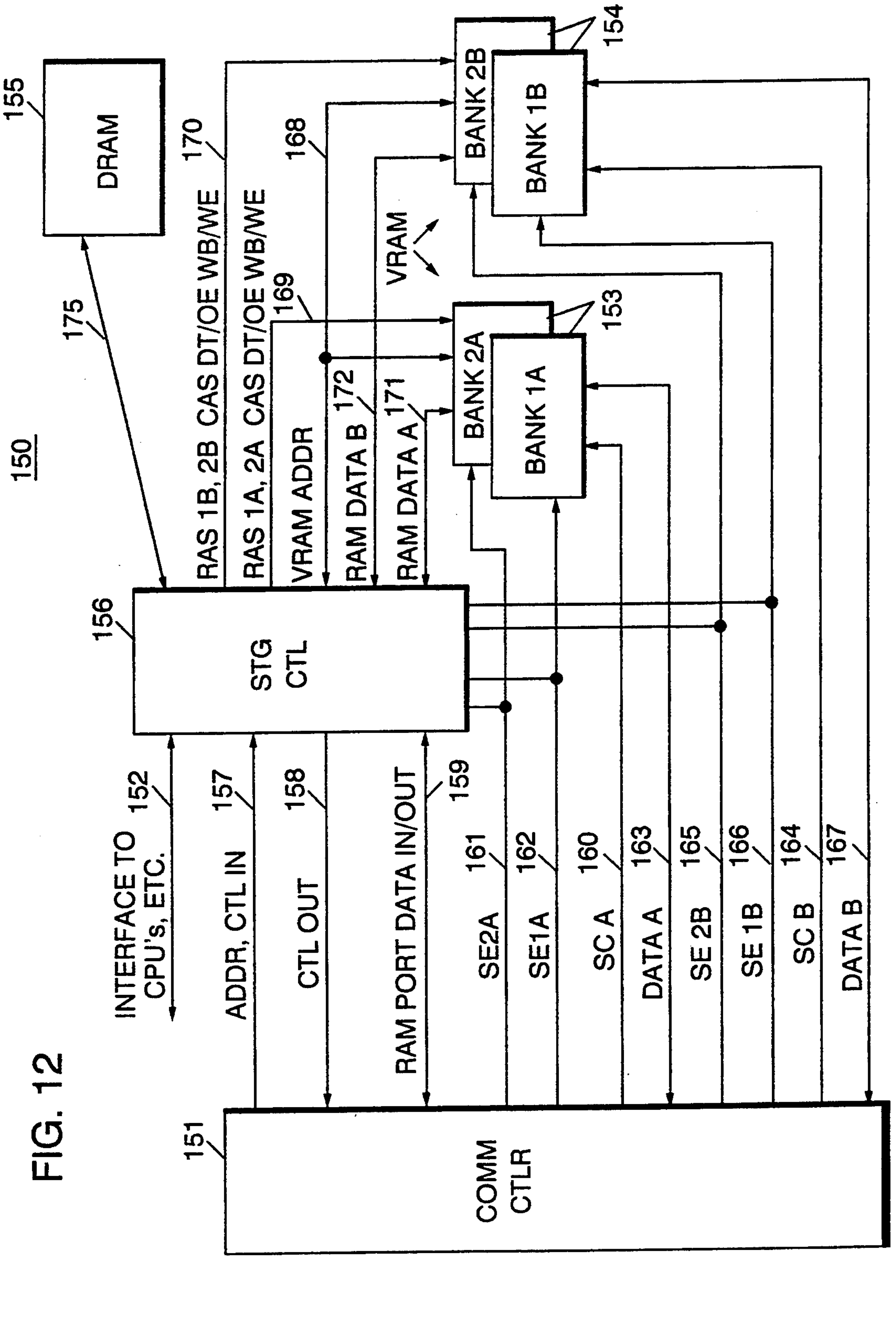
FIG. 12 is a schematic block diagram of a preferred configuration of dual-ported storage which interfaces to a communication network in accordance with the present invention, and utilizes both VRAM and single ported DRAM (dynamic random access memory) types of integrated memory devices for providing potentially optimal cost/performance benefits.

FIG. 12 illustrates a preferred storage configuration 150 for efficient use of the present invention. As in FIG. 5, storage 150 interfaces with a comm ctlr, shown here at 151, and with CPU's and other entities, through an interface shown here at 152. The unique aspect of arrangement 150 is that it combines into one addressable storage entity VRAM and simple DRAM devices operating in accordance with the present invention. The VRAM devices, shown at 153 and 154, and the DRAM devices shown at 155, operate under direction of a common storage controller (stge ctlr) 156. The stge ctlr directs selection of and operations of these devices in response to request signals, such signals being presented by the comm ctlr at 157, and by CPU's and other entities at 152.

The VRAM and DRAM devices are assigned different portions of a storage address space used by the comm ctlr, CPU and other entities (e.g. I/O; refer to FIG. 2). The VRAM devices are accessible in both RAM and SAM modes as described earlier, while the DRAM devices are accessible only in RAM mode. The VRAM devices are accessible to all system entities (CPU, comm ctlr) in RAM mode, and only to the comm ctlr in SAM mode. In this configuration, the VRAM devices are arranged in two groups of device banks; banks 1A and 2A, shown at 153, and banks 1B and 2B shown at 154. The purpose of this grouping arrangement will become clear as this description progresses.

DRAM's are cheaper than VRAM's but also have more limited access bandwidth than VRAM's. Accordingly, by using the VRAM's in this arrangement primarily for storage of data being communicated by the comm ctlr, and by using DRAM's primarily for storing information other than data being communicated by the comm ctlr (including the Request and Status Descriptors described earlier), efficiencies of storage can be realized (in comparison to a storage configuration containing only VRAM'S) while allowing for efficient transfer of data relative to ultra high speed communication processes that would be unduly blocked or limited if dependent upon DRAM's.

Each VRAM bank shown in FIG. 12 is similar structurally to the device configuration shown in FIG. 5; i.e. it contains plural RAM arrays, and a shift register connecting to the arrays in parallel, so that data is transferrable in parallel between the register and an entire row of storage cells extending through all arrays.

Depending upon bandwidth requirements, it could be desirable to equip each bank with plural VRAM devices of the type indicated in FIG. 5, so as to increase both the parallel transfer width at the interface between RAM arrays and registers, and the sequential transfer width at the interface between the registers and comm ctlr. Thus, an aggregate of 4 such devices in each bank would support parallel transfers of 512×16 bit page blocks (compared to the transfer width of 512×4 bits indicated in FIG. 5), and sequential transfers of 16 bit parallel units relative to the comm ctlr (instead of the 4 bit units suggested in FIG. 5).

With an appropriate mapping of system addresses into the A and B banks, the VRAM and DRAM banks can be made more efficiently available to all requesting entities. Thus, while any entity is accessing data in DRAM, requests for access to any VRAM bank can be processed by the stge ctlr, and while any entity is accessing data in the A group of VRAM banks requests for access to the B group of banks can be serviced. Also, as will be shown below, while the comm ctrl is transferring data to an A or B bank in association with a PWrT request, it can have another request for access to the other bank (B or A) serviced by the stge ctlr.

The foregoing address mapping could, for instance, be a simple assignment of successive system page addresses to rows in different banks, in a simple four-way interleave; e.g. a page to bank 1A, a next page to bank 1B, a next page to 2A, a next page to 2B, a next page to 1A, etc.).

Lines 157–167 connect comm ctlr 151 to storage subsystem 150. Lines 157 convey address and control signals from comm ctlr 151 to stge ctlr 156. Lines 158 return control signals from the stge ctlr to the comm ctlr (including request acknowledgements). Control signals on lines 157 indicate the type of storage access cycle requested: normal Rd, normal Wr, RdT, PWrT, or WrT.

Data associated with normal Rd/Wr requests is transferred between the comm ctlr and stg ctlr via lines 159, and between the stge ctlr and devices 153–155 by other lines discussed below. Data associated with RdT and WrT requests is transferred between the comm ctlr and shift registers in banks 1A and 2A via lines 163, and between the comm ctlr and registers in banks 1B and 2B via lines 167.

Lines 160–162 and 164–166 are control lines activated by the comm ctlr for controlling VRAM bank selection in association with SAM mode requests. Data associated with such requests is transferred between the Comm ctlr and VRAM bank shift registers via lines 163 or 167 (163 for A banks, and 167 for B banks). As shown below, in discussion of FIGS. 13 and 14, lines 161–162 and 165–166 are driven alternately by the comm ctlr and stge ctlr in association with RdT, WrT and RMW operations; these lines being driven by the stge ctlr during the operation and by the comm ctlr while data is being shifted into or out of a VRAM bank shift register.

Transfers of data relative to RAM arrays in device banks 153–155 (between arrays and RAM mode requestors, as well as between arrays and associated bank shift registers) are controlled by the stge ctlr via lines 168–175. Control signals associated with requests for access to DRAM's 155, and data associated with such requests, are handled via lines shown collectively at 175.

Control signals associated with selection of VRAM banks, and determination of operational modes in selected banks, are asserted by the stge ctlr on lines 168–170. Data signals associated with RAM mode (normal Rd/Wr) requests to the VRAM devices are transferred between the stge ctlr and a RAM array in a selected bank, via lines 171 (for an A bank) or 172 (for a B bank). As explained above, such data signals are further transferred between the stge ctlr and requestor via interface 152 or lines 159.

Lines 168 are used to select a VRAM bank in A and B groups 153, 154. Lines 169 are used to select row and column coordinates in RAM arrays of a selected A bank (1A or 2A), and lines 170 are used to select row and column coordinates in RAM arrays a selected B bank (1B or 2B). Lines 169 and 170 are used also to define operational modes of a bank selected in the respective A and B groups (normal Rd/Wr, RdT/WrT or PWrT).

The selection of row and column coordinates via lines 169 and 170, is determined by RAS and CAS signals placed on respective lines. The RAS signals are applied to individual banks via four separate sets of lines; RAS 1A to bank 1A, RAS 2A to bank 2A, RAS 1B to bank 1B, and RAS 2B to bank 2B. The CAS signals are applied to both banks of the respective group; CAS on lines 169 to banks 1A and 2A, and CAS on lines 170 to banks 1B and 2B.

Other signals indicated adjacent lines 169 and 170—DT/OE and WB/WE—are used in combination with the RAS and CAS signals above, and an SE signal on one of lines 161, 162, 165 or 166, to define the operational mode of the selected bank relative to a respectively selected RAM array coordinate. of a selected bank in the respective A and B groups. DT/OE is an abbreviation for "Data Transfer/Output Enable", WB/WE is an abbreviation for "Write Per Bit/Write Enable", and SE is an abbreviation for "Serial Enable".

The combinational use of these signals relative to a single (integrated) VRAM device is fully specified by the device manufacturer; e.g. usage in the Toshiba Memory Products Company part number TC524256P/Z mentioned above is fully specified in a "Toshiba MOS Memory Products" document published by that manufacturer. The present usage is consistent with the specified usage inasmuch as these signals are ultimately driven in effect to a single (selected) bank which functionally is identical to an integrated VRAM device.

When handling normal Rd/Wr requests, the stge ctlr decodes an address presented by the requestor (comm ctlr, CPU or other entity) and asserts signals on lines 168 to select one VRAM bank in one group, A or B. The stge ctlr further asserts CAS, RAS, DT/OE and WB/WE signals, relative to the selected bank, via lines 169 or 170; these signals selecting a coordinate relative to the RAM arrays in the selected bank, and establishing the mode of operation relative to the selected coordinate (normal Rd or normal Wr).

In response to requests for SAM mode transfers (RdT, WrT and PWrT), the stge ctlr translates an address on lines 157 into VRAM address signals on lines 168 designating one of the VRAM banks (the one to which the address given by the comm ctlr is mapped), and RAS and CAS signals on lines 169 or 170 defining a page/row coordinate in a RAM array in the selected bank and an operation to be conducted relative to the selected bank. If the request is a RdT or WrT, data is transferred in parallel between the defined row and coordinate and the shift register of the selected bank. If the request is a PWrT, the sequential transfer path between the shift register in the selected VRAM bank and the comm ctlr is conditioned for an input/write operation (as in FIG. 5, the default condition of that path is for sustaining output/read data transfer). At completion of such operation, an acknowledgement is returned from the stge ctlr to the comm ctlr.

Figure 13:
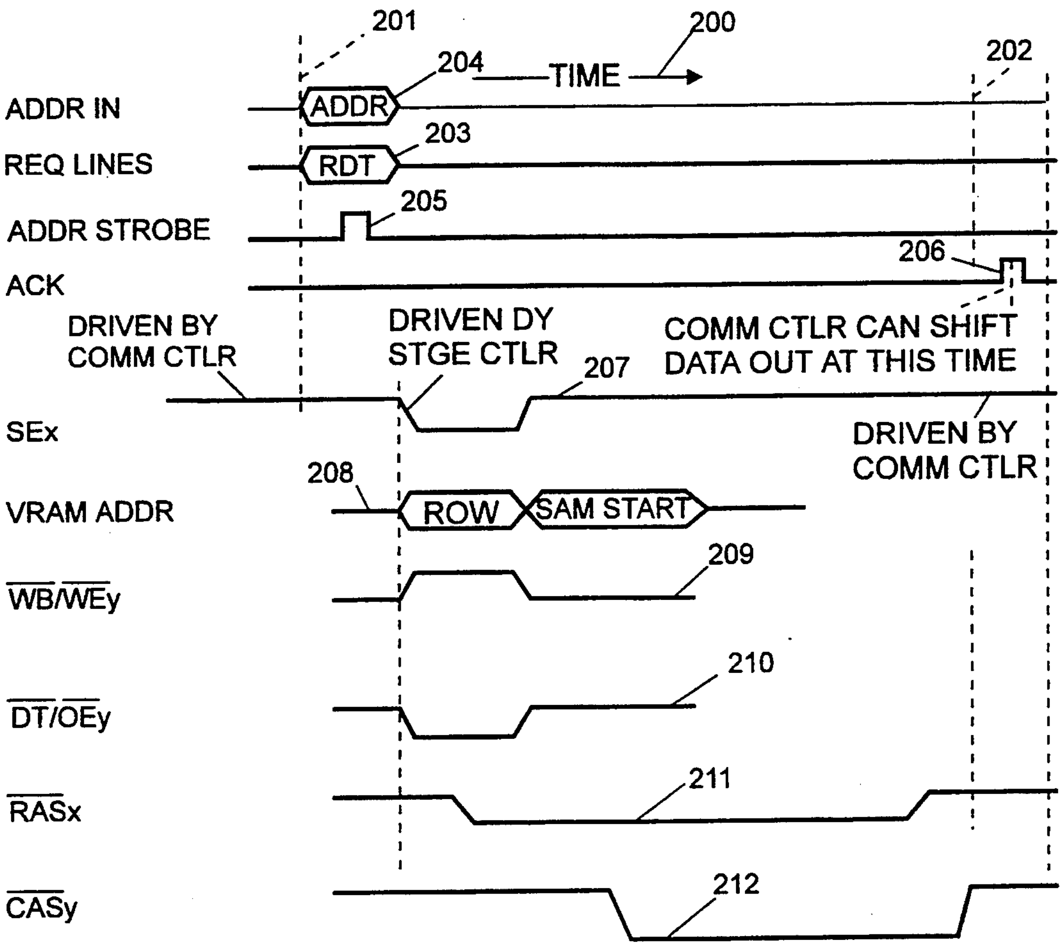
FIG. 13 is a chart used for explaining the interaction between storage and communication controllers relative to storage transfer operations RdT/WrT conducted in sequential access mode.

While the requested (RdT) operation is being performed, the stge ctlr selectively drives the SE (Serial Enable) lines 161–162 and 165–166. Signals on these lines, along with DT/OE and WB/WE signals on lines 169 or 170 serve to define the operational mode relative to the selected VRAM bank (RdT, WrT or PWrT) in accordance with specifications provided by the VRAM device manufacturer. Such specification also requires that the SC (Serial Clock) line (line 160 or 164 in this configuration) be held in a steady state while the respective sequential transfer occurs. From the time it presents a SAM mode request to the time it receives the associated acknowledgement, the comm ctlr disconnects itself from those of lines 160–162 and 164–166 which are associated with the addressed VRAM bank (the other bank continues any previously started operation) allowing the stge ctlr to use the respective lines. With acknowledgement of a requested (RdT) operation, control of these lines is returned to the comm ctlr for use in controlling sequential transfer of data as needed (i.e. transfer from the shift register in the associated VRAM bank to the comm ctlr). This revertive use of certain of the SE control lines is illustrated in FIG. 13.

The bit-parallel width of the sequential transfer is determined by the bank configuration (i.e. the transfer is conducted 4, 8, 16 or 32 bits at a time depending upon the internal configuration of the selected VRAM bank). The transfer is conducted via lines 163 if an A bank is selected or lines 167 if a B bank is chosen. As in FIG. 5, this transfer starts at a position in the shift register defined by a pointer whose value is equal to the CAS value generated from the request address.

After acknowledgement of a PWrT request, data is transferred sequentially from the comm ctlr to successive positions in the shift register in the designated VRAM bank via lines 163 or 167 connecting to that bank. As in FIG. 5, this transfer begins at a pointer position defined by the CAS generated from the associated request address, and serves to prepare the respective VRAM bank internally for a parallel transfer associated with a forthcoming WrT request addressed to that bank.

As in FIG. 5, each WrT request establishes a 0 pointer value, and each such request must be preceded by a PWrT request to the same address if either the last request operation relative to the respective bank was other than a WrT or the present request is part of an RMW sequence of request operations.

5.2 Sequencing of SAM Mode Operations

Figure 14:
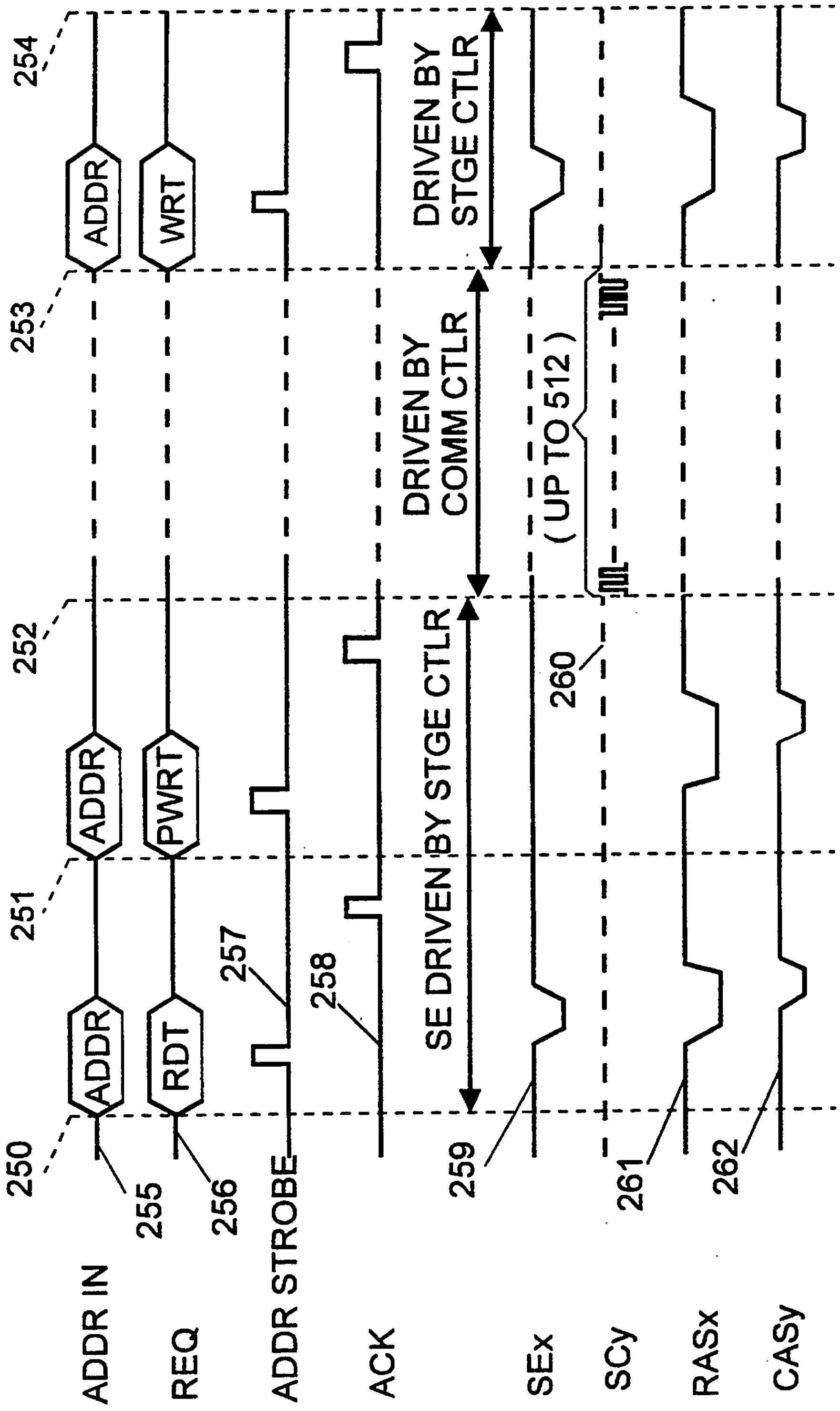
FIG. 14 is a chart for explaining the interaction between storage and communication controllers relative to Read Modify Write (RMW) storage input transfer operations conducted in sequential access mode.

FIG. 13 shows how the comm ctlr and stge ctlr interact relative to RdT requests, and WrT requests that are not part of an RMW sequence. FIG. 14 is used to explain their interaction in RMW sequences.

In FIG. 13, the direction of advancing time is shown at 200, and lines 201 and 202 indicate the beginning and end of a cycle of stge ctlr operation relative to a RdT request presented (by the comm ctlr) at 203. Associated address and address strobe signals, presented by the comm ctlr, are respectively indicated at 204 and 205. Line 206 shows the acknowledge signal returned by the stge ctlr at completion of the operation. The comment immediately below this line indicates that the comm ctlr may begin its sequential transfer of the data read in this operation as soon as it receives the acknowledge.

Lines 207–212, below line 206, show states of signal lines which are driven by the stge ctlr. Line 207, associated with signal SEx (the signal on the Serial Enable line connecting to the selected VRAM bank represented by x; see Notation comment at bottom of FIG. 13), is driven alternately by the stge ctlr and comm ctlr; by the stge ctlr while it is accessing the VRAM bank, and by the comm ctlr afterwards.

The VRAM Address signals shown on line 208 are used initially during the operation to signal the address of the RAM row to be accessed, and subsequently to indicate the start of the parallel transfer phase of the operation (RAM row to shift register).

Lines 207 and 209–212 respectively indicate states of inverses of signals SE, WB/WE, DT/OE, RAS and CAS on lines (FIG. 12) that connect to the selected VRAM bank. Signals denoted by "x" connect only to the selected bank, and signals denoted by "y" connect both to the selected bank and the VRAM bank in the same (A or B) group as the selected bank. The combined states of these signals at this phase of the operation represent a code defining the operation to be performed as defined by specifications given by the manufacturer of the VRAM devices used in the present banks. As seen in FIG. 13, an RdT is defined by signals at 207, 209, 210 and 212 respectively: L, H, L, and H (L representing "low" and H denoting "high) simultaneously.

Later in the operation, the RASx and CASy signals are driven to states defining a row and column in the selected bank. As described earlier, for a RdT the contents of that row are transferred in parallel to the respective bank's shift register. The CAS value is latched as a pointer to a position in the shift register for starting the sequential transfer from the shift register to the comm ctlr. If the CAS value is 0, the sequential transfer begins at one end of the shift register and progresses through successive positions in the register until either the end of required data or the end of the register is reached.

The signalling patterns for WrT and PWrT operations follow those just described, with the exceptions that signals designating these functions, at 207, 209, 210 and 212 are:

For WrT: L, L, L, H respectively

For PWrT: H, L, L, H respectively

Naturally, in PWrT and WrT operations, the sequential transfer relative to the VRAM shift register occurs between the acknowledgement of the PWrT and the beginning of the WrT operation, and is directed from the comm ctlr to the shift register in the selected VRAM.

FIG. 14 shows the signalling sequence for an RMW operations; i.e. a RdT operation relative to a selected address in a selected VRAM bank, followed by a PWrT relative to the same address in the same bank, followed by a WrT relative to the same address in the same bank.

Vertical lines 251–254 delineate times of these operations. Lines 250 and 251 delineate the time of the RdT operation, lines 251 and 252 the time of the PWrT operation, and lines 253 and 254 the time of the WrT operation. Lines 252 and 253 delineate the sequential transfer which occurs between the PWrT and WrT operations.

Horizontal lines 255–262 indicate signal states during these delineated times. Line 255 shows the Addr In signal function asserted (by the comm ctlr) at an early phase of each of the three operations. It is understood that this function is the same in all three operations is the same (i.e. it designates the same row in one selected VRAM bank).

Line 256 shows the request signal function asserted at the beginning of each operation. Line 257 shows the Address Strobe signal function that accompanies the presentation of the Addr In and request signals. Line 258 shows the timing of acknowledge signals asserted by the stge ctlr at the end of each operation.

Line 259 shows the alternate control by the comm ctlr and stge ctlr of the SE (Serial Enable) line which connects to the selected VRAM bank "x". Line 260 shows the SC (Serial Clock) signals presented by the comm ctlr during the sequential transfer of data from it to the shift register in the selected VRAM bank.

Finally, lines 261 and 262 respectively show the times of assertion of the appropriate RAS and CAS signals.

The state of the VRAM Addr signal function asserted by the stge ctlr is not shown here but understood to define the selected bank and row as it did in FIG. 13. Similarly, states of the WB/WE and DT/OE signals, which together with the SE and CAS signals define the operation to be performed relative to the selected bank and address, are omitted since they are fully explained above.

We claim:

1. A data communication system comprising:

addressable storage means having a random access mode of operation and a sequential access mode of operation; said storage means comprising at least one random access memory array having data storage cells arranged in discretely addressable rows and columns, each row containing a predetermined large number of storage cells, a sequential access data storage array, and means coupling said random and sequential access arrays for enabling data to be transferred bidirectionally, in parallel, between all cells in any row in the random access array and the sequential access array; said random access array having a random access port for directly reading data from and writing data to a selected small number of cells in a selected column position of any row in said random access array; said sequential access array having a serial access port for transferring data in a serial form into or out of said serial access array and thereby reading data indirectly from or to an entire row of said cells in said random access array; said data transferred through said serial access port including general purpose data that does not represent graphic images; and communication control means coupled between said storage means and at least one data communication link for transferring data between said storage means and said communication link; said communication control means having connections to both said random access port and said serial access port for selectively transferring data bidirectionally between said at least one communication link and said random access memory array either directly through said random access port or indirectly through said serial access port and said sequential access array; said connections including means for routing transfers of varriable sized blocks of data to said random access ports for data blocks of less than a determined size while routing transfers of blocks of at least said predetermined size through said serial access port.

2. The data communication system in accordance with claim 1 wherein:

said connections between said random access and serial access ports and said communication control means enable said communication control means to transfer data between itself and said ports defining control and status functions of communication processes conducted by said communication control means relative to said at least one communication link; said communication control means reading said data defining control functions from said random access array directly via said random access port, and using said data to control said communication processes; said communication control means generating said data defining said status functions and controlling writing of said generated data directly into said random access array via said random access port.

3. The data communication system in accordance with claim 1 wherein said storage means includes:

at least one additional random access array having no connections to said random access tray and said sequential access array; and wherein said communication control means is coupled to said additional random access array for exchanging data with said additional array.

4. The data communication system in accordance with claim 3 wherein:

data transferred to and from said random access array via either of said random access and sequential access ports includes data being communicated on said link; and data exchanged between said communication control means and said additional random access array consists only of data that represents information other than data being communicated on said link.

5. The data communication system in accordance with claim 4 wherein said information other than data being communicated includes first information used by said communication control means to control communication processes on said data communication link, and second information generated by said communication control means representing status of said communication processes.

6. The data communication system in accordance with claim 1 wherein:

said sequential access array comprises data storage cells located at positions corresponding to positions of said columns in said random access array, and said data exchanged between said communication control means and said sequential access array is transferred in a sequential mode relative to successively positioned said data storage cells in said sequential access array; and said storage means is controlled by said communication control means to allow said sequential mode transfer to begin and end at arbitrary storage cell positions in said sequential access array that are designated by said communication control means.

7. The data communication system in accordance with claim 1 wherein:

said communication control means operates to control transfers of varied sized blocks of data between said storage means and said link; said data block transfers being conducted selectively through different first and second data transfer paths selected as a function of the size of the block being transferred; where said first data transfer path is a direct transfer path between said communication control means and said random access array, and said second data transfer path is a indirect transfer path between said communication control means and said random access array, said indirect transfer path including said sequential access array and requiring transfer of said data through said sequential access array.

8. The data communication system in accordance with claim 6 wherein:

said communication control means control execution of a read-modify-write operation through said sequential access array, for modifying a selected portion of data contained in a said row in said random access array; said read-modify-write operation requiring said communication control means to control said storage means to first read data in parallel from a selected said row in said random access array to said sequential access array, to then transfer data in said sequential mode form said communication control means to a series of storage cell positions in said sequential access array selected by said communication control means, and to then cause data to be written in parallel from said sequential access array to said selected row in said random access array; whereby data in a series of column positions in said selected row, which correspond to the storage cell positions written in said sequential mode, is selectively modified while data in other positions in said selected row is not modified.

9. The data communication system in accordance with claim 6 wherein:

said communication control means controls transfers of varied sized blocks of data between said communication link and addressable storage positions in said random access array selectively through a direct data transfer first path, between said communication control means and said random access array, and an indirect data transfer second path through both said sequential access array and said means coupling said random and sequential access arrays; and said communication control means selectively control writing of said varied sized data blocks through said direct and indirect data transfer paths as a function of the size of each said data block, so that data blocks shorter than a predetermined first size are transferred through said direct data transfer path and data blocks of at least said first size are transferred through said indirect data transfer path.

10. In a data processing system including a high speed data communication channel, apparatus for sustaining efficient transfer of data between said communication channel and other parts of said system, said apparatus comprising:

a dual ported data storage subsystem; said storage subsystem including a video RAM (VRAM) memory structure having a random access port and a sequential access port; said VRAM structure including random access and sequential access storage arrays; said random access and sequential access storage arrays having respective separate connections to said random access port and said sequential access port; said VRAM structure further including an internal connection, between said random access and sequential access arrays, for transferring blocks of up to N bytes of data in parallel between the arrays, where N is much larger than the number of bytes which can be transferred in parallel between said random access array and said random access port; said data blocks transferred through said sequential array including general purpose data having no association with graphic images; and data communication control means, coupled between said data communication channel and both said random access and said sequential access ports of said data storage subsystem, for transferring variously sized blocks of data between said data communication channel and said data storage subsystem through both of said ports; said communication control means selecting between said ports as a function of the size of each said block of data and routing each said block of data through a respectively selected one of said ports as a function of the respective block size.

11. The apparatus of claim 10 wherein said data communication control means transfers said variously sized blocks of data bidirectionally between said data communication channel and said ports of said data storage subsystem.

12. In a data processing system including a high speed data communication channel, apparatus for sustaining efficient transfer of data between said communication channel and other parts of said system, said apparatus comprising:

a dual ported data storage subsystem; said storage subsystem including a video RAM (VRAM) memory structure having a random access port and a sequential access port; said VRAM structure including random access and sequential access storage arrays; said random access and sequential access storage arrays having respective separate connections to said random access port and said sequential access port; said VRAM structure further including an internal connection, between said random access and sequential access arrays, for transferring blocks of up to N bytes of data in parallel between the arrays, where N is much larger than the number of bytes which can be transferred in parallel between said random access array and said random access port; said data blocks transferred through said sequential array including general purpose data having no association with graphic images;

data communication control means, coupled between said data communication channel and both said random access and sequential access ports of said data storage subsystem, for transferring variously sized blocks of data bidirectionally between said data communication channel and said data storage subsystem through said random access and sequential access ports; said communication control means including:

means for selectively routing transfers of said variously sized blocks of data between said data communication channel and both said sequential access and random access ports of said data storage subsystem, said routing means selecting between said sequential access port and said random access port as a function of the size of each said block being transferred.

13. Apparatus according to claim 12 wherein said data communication control means includes:

means for accessing said data storage subsystem, via said random access port, to read data representing first information form said data storage subsystem, and to write data representing second information to said data storage subsystem; wherein said first information is used by said communication control means for controlling communication processes being conducted by said communication control means relative to said data communication channel, and said second information indicates the instantaneous status of such processes.

14. Apparatus according to claim 13 including a data processor separate from said communication control means, said apparatus including means for coupling said data processor to said random access port of said data storage subsystem; said means connecting said data processor to said random access port being discretely separate from the connection between said random access port and said data communication control means; so that said processor and said data communication control means can operate independently of each other to access said data storage subsystem via said random access port.

15. Apparatus according to claim 12 wherein:

said data storage subsystem contains a second random access storage array isolated from both said random access and sequential access storage arrays, said second random access array having a connection only to said random access port of said data storage subsystem, and being accessible to said communication control means only for transferring data through said random access port; and said means for selectively routing data includes means for selectively routing data between said communication control means and both said random access array and said second random access array through said random access port.

16. In a high speed data communication network having plural access nodes linked by a high speed data communication channel, a method of handling data communications relative to said channel at any one of said nodes, said method comprising:

storing data, that is being received from and transmitted to said channel at said one node, in a storage subsystem having random access and sequential access ports, and containing random access and sequential access storage arrays with respective separate connections to said random access and sequential access ports; said arrays also having an internal connection for transferring large blocks of data between said arrays in parallel; each said large block of data being larger in size than the amount of data which can be transferred in parallel through said random access port; said random access array having discretely addressable blocks of storage cells relative to which individual said large data blocks are transferrable; said data transferred through said sequential access port including general purpose data having no graphic significance; and transferring various length blocks of data, that are being communicated over said channel, through either a direct or an indirect path between said channel and said random access array of said subsystem; said direct path extending directly through said random access port and said indirect path extending through said sequential access port and said sequential access array; and when transferring each of said various length blocks of data, selecting said direct path if the respective said block of data has less than a predetermined length and said indirect path if the respective block of data has at least said predetermined length.

17. The method of handling data communications according to claim 16 comprising:

when transferring a said block of data through said indirect path, selectively performing a read-modify-write operation relative to said storage subsystem; wherein said read-modify-write operation is executed by:

in a first data transfer operation, transferring data in parallel from a selected block address in said random access array to said sequential access array, and in a second data transfer operation, following said first data transfer operation, transferring data in parallel from said sequential access array to said selected block address in said random access array; and between said first and second data transfer operations, conducting a serial data transfer operation to overwrite a selected portion of the data contained in said sequential access array as a result of said first data transfer operation; whereby the data transferred to and stored in said selected block address as a result of said second operations partly includes data that is the same as data previously contained at said address and partly includes data not previously contained at that address.

* * * * *